United States Patent
Hayashida et al.

(10) Patent No.: US 9,962,684 B2
(45) Date of Patent: May 8, 2018

(54) CERIUM-ZIRCONIUM-BASED COMPOSITE OXIDE AND METHOD FOR PRODUCING SAME

(71) Applicant: DAIICHI KIGENSO KAGAKU KOGYO CO., LTD., Osaka-shi, Osaka (JP)

(72) Inventors: Hiroyuki Hayashida, Osaka (JP); Akiko Tatsumi, Osaka (JP)

(73) Assignee: DAIICHI KIGENSO KAGAKU KOGYO CO., LTD., Osaka (JP)

( * ) Notice: Subject to any disclaimer, the term of this patent is extended or adjusted under 35 U.S.C. 154(b) by 0 days. days.

(21) Appl. No.: 15/125,430

(22) PCT Filed: Apr. 25, 2014

(86) PCT No.: PCT/JP2014/061662
§ 371 (c)(1),
(2) Date: Sep. 12, 2016

(87) PCT Pub. No.: WO2015/145788
PCT Pub. Date: Oct. 1, 2015

(65) Prior Publication Data
US 2017/0072386 A1    Mar. 16, 2017

(30) Foreign Application Priority Data

Mar. 25, 2014 (JP) .................. 2014-062327
Mar. 25, 2014 (JP) .................. 2014-062334

(51) Int. Cl.
*B01J 21/06* (2006.01)
*B01J 23/02* (2006.01)
(Continued)

(52) U.S. Cl.
CPC ............... *B01J 23/83* (2013.01); *B01J 23/10* (2013.01); *B01J 23/34* (2013.01); *B01J 23/72* (2013.01);
(Continued)

(58) Field of Classification Search
CPC ... B01J 23/02; B01J 23/04; B01J 23/10; B01J 23/34; B01J 23/72; B01J 23/745;
(Continued)

(56) References Cited

U.S. PATENT DOCUMENTS 6,458,741 B1 * 10/2002 Roark ...................... A62D 3/38
423/245.3
7,214,643 B2 * 5/2007 Yamamoto ............. C01G 25/00
423/592.1
(Continued)

FOREIGN PATENT DOCUMENTS

EP    2 404 669 A1    1/2012
EP    2 671 638 A1    12/2013
(Continued)

OTHER PUBLICATIONS

International Search Report dated Jul. 22, 2014, issued in counterpart international application No. PCT/JP2014/061662 (4 pages).
(Continued)

*Primary Examiner* — Cam N. Nguyen
(74) *Attorney, Agent, or Firm* — Westerman, Hattori, Daniels & Adrian, LLP

(57) ABSTRACT

Provided is a cerium-zirconium-based composite oxide having an excellent OSC, high catalytic activity, and excellent heat resistance, and also provided is a method for producing the same. The cerium-zirconium-based composite oxide comprises cerium, zirconium, and a third element other than these elements. The third element is (a) a transition metal element or (b) at least one or more elements selected from (Continued)

the group consisting of rare earth elements and alkaline earth metal elements. After a heat treatment at 1,000° C. to 1,100° C. for 3 hours, (1) the composite oxide has a crystal structure containing a pyrochlore phase, (2) a value of $\{I111/(I111+I222)\} \times 100$ is 1 or more, and (3) the composite oxide has an oxygen storage capacity at 600° C. of 0.05 mmol/g or more, and an oxygen storage capacity at 750° C. of 0.3 mmol/g or more.

15 Claims, 8 Drawing Sheets

(51) Int. Cl.
| | |
|---|---|
| *B01J 23/04* | (2006.01) |
| *B01J 23/10* | (2006.01) |
| *B01J 23/34* | (2006.01) |
| *B01J 23/72* | (2006.01) |
| *B01J 23/745* | (2006.01) |
| *B01J 23/75* | (2006.01) |
| *B01J 23/755* | (2006.01) |
| *B01J 23/83* | (2006.01) |
| *B01J 37/08* | (2006.01) |
| *B01J 37/00* | (2006.01) |
| *C01G 25/00* | (2006.01) |
| *C01G 45/12* | (2006.01) |
| *C01G 49/00* | (2006.01) |
| *C01G 51/00* | (2006.01) |
| *C01G 53/00* | (2006.01) |
| *C04B 35/486* | (2006.01) |
| *C04B 35/50* | (2006.01) |
| *C04B 35/653* | (2006.01) |
| *C01G 45/00* | (2006.01) |

(52) U.S. Cl.
CPC .......... *B01J 23/745* (2013.01); *B01J 23/75* (2013.01); *B01J 23/755* (2013.01); *B01J 37/0036* (2013.01); *B01J 37/08* (2013.01); *C01G 25/00* (2013.01); *C01G 25/006* (2013.01); *C01G 45/006* (2013.01); *C01G 45/1221* (2013.01); *C01G 49/009* (2013.01); *C01G 49/0054* (2013.01); *C01G 51/006* (2013.01); *C01G 51/40* (2013.01); *C01G 53/006* (2013.01); *C01G 53/40* (2013.01); *C04B 35/486* (2013.01); *C04B 35/50* (2013.01); *C04B 35/653* (2013.01); *C01P 2002/36* (2013.01); *C01P 2002/72* (2013.01); *C01P 2002/74* (2013.01); *C01P 2006/12* (2013.01); *C01P 2006/90* (2013.01); *C04B 2235/3205* (2013.01); *C04B 2235/3206* (2013.01); *C04B 2235/3208* (2013.01); *C04B 2235/3224* (2013.01); *C04B 2235/3225* (2013.01); *C04B 2235/3227* (2013.01); *C04B 2235/3229* (2013.01); *C04B 2235/3244* (2013.01); *C04B 2235/3262* (2013.01); *C04B 2235/3272* (2013.01); *C04B 2235/3275* (2013.01); *C04B 2235/3279* (2013.01); *C04B 2235/3281* (2013.01); *C04B 2235/5409* (2013.01); *C04B 2235/5436* (2013.01); *C04B 2235/80* (2013.01)

(58) Field of Classification Search
CPC . B01J 23/75; B01J 23/755; B01J 23/83; B01J 37/08; B01J 37/0036; B01J 21/066
See application file for complete search history.

(56) References Cited

U.S. PATENT DOCUMENTS

| | | | | |
|---|---|---|---|---|
| 7,919,429 | B2* | 4/2011 | Okamoto | B01D 53/945 502/302 |
| 8,187,996 | B2* | 5/2012 | Matsueda | B01D 53/945 423/213.5 |
| 8,202,819 | B2* | 6/2012 | Kohara | B01D 53/9468 422/169 |
| 8,697,600 | B2* | 4/2014 | Nobukawa | B01D 53/945 502/302 |
| 8,853,120 | B2* | 10/2014 | Aoki | B01D 53/945 502/302 |
| 9,376,327 | B2* | 6/2016 | Morikawa | B01J 35/04 |
| 9,539,542 | B2* | 1/2017 | Mikita | B01D 53/945 |
| 2007/0155624 | A1 | 7/2007 | Wakita et al. | |
| 2008/0066458 | A1 | 3/2008 | Toyada et al. | |
| 2010/0273646 | A1 | 10/2010 | Yasuda et al. | |
| 2011/0171092 | A1 | 7/2011 | Wakita et al. | |
| 2013/0029840 | A1 | 1/2013 | Morikawa et al. | |
| 2013/0143732 | A1* | 6/2013 | Aoki | B01D 53/9445 502/304 |
| 2015/0273437 | A1 | 10/2015 | Miura et al. | |

FOREIGN PATENT DOCUMENTS

| | | |
|---|---|---|
| JP | 2003-73123 A | 3/2003 |
| JP | 2005-231951 A | 9/2005 |
| JP | 2005-305363 A | 11/2005 |
| JP | 2008-68225 A | 3/2008 |
| JP | 2009-84061 A | 4/2009 |
| JP | 2010-104973 A | 5/2010 |
| JP | 2011-219329 A | 11/2011 |
| JP | 2012-135716 A | 7/2012 |
| JP | 2012-239982 A | 12/2012 |
| JP | 2014-114180 A | 6/2014 |
| JP | 2015-71520 A | 4/2015 |
| WO | 2006/030763 A1 | 3/2006 |
| WO | 2009/101886 A1 | 8/2009 |
| WO | 2011/129460 A1 | 10/2011 |
| WO | 2015/049575 A1 | 4/2015 |

OTHER PUBLICATIONS

Office Action dated Jul. 19, 2016, of counterpart Japanese Applciation No. 2014-062327 (W/English translation) (11 pages).
Office Action dated Jul. 19, 2016, of counterpart Japanese Applciation No. 2014-062334 (W/English translation) (9 pages).
Extended (supplementary) European Search Report dated May 18, 2017, issued in counterpart European Application No. 14887678.2. (15 pages).

* cited by examiner (a)

(b)

CERIUM-ZIRCONIUM-BASED COMPOSITE OXIDE AND METHOD FOR PRODUCING SAME

TECHNICAL FIELD

The present invention relates to a cerium-zirconium-based composite oxide that can be used, for example, as an exhaust gas purifying catalyst, and a method for producing the same.

BACKGROUND ART

Exhaust gas discharged from internal combustion engines of vehicles, etc., or combustion engines, such as boilers, contains hydrocarbon (HC), carbon monoxide (CO), nitrogen oxide (NOx), and like hazardous substances that cause air pollution. Efficient purification of these hazardous substances is an important issue in terms of, for example, prevention of environmental contamination. Exhaust gas purification techniques that can purify these three hazardous substances at the same time have been actively studied. For example, there is a known technique of purifying the three hazardous substances at the same time by the catalytic function of catalysts capable of purifying hazardous substances provided in internal combustion engines or combustion engines. Such catalysts are generally called three-way exhaust-gas catalysts, and some of them have already been put into practical use.

In recent years, it is desired for three-way exhaust-gas catalysts for automotive applications to efficiently purify exhaust gas even when the concentration of hazardous substances (CO, HC, and NOx) rapidly changes from several ppm to several percent. That is, there is an increasing demand for three-way exhaust-gas catalysts that can flexibly respond to rapid changes in the concentration of hazardous gas. Moreover, the system for purifying hazardous substances using such a catalyst is desired to maintain the oxygen concentration at a predetermined level or higher. This is because oxygen present in exhaust gas promotes the oxidation of CO and HC, and the reduction reaction of NOx, and thus the function of the purifying system is further improved by maintaining the oxygen concentration at a constant level. However, for vehicles, it is difficult to maintain a constant engine combustion state because the running state varies depending on, for example, the degree of road congestion. The oxygen concentration of the exhaust gas also changes continuously. If the oxygen concentration decreases, the performance of purifying hazardous substances by the catalyst is also reduced, thereby making it difficult to build a high-performance purifying system. From such a viewpoint, in recent methods, a compound having an oxygen storage capacity (hereinafter referred to as "OSC") is mixed into exhaust gas purifying catalysts as an OSC agent. Since the OSC agent can supply oxygen when the oxygen concentration of the exhaust gas is low, it is easier to prevent a decrease in the function of purifying hazardous substances in the purifying system.

Ceria powder is known as an OSC agent. It is clarified that the use of ceria powder, which has a relatively large OSC, as an OSC agent for exhaust gas purifying catalysts increases the efficiency of treating exhaust gas. Various proposals have been made so far for ceria-based powder whose oxygen storage capacity and oxygen release properties are improved, such as ceria-zirconia-based composite oxides, and exhaust gas purifying catalysts using the ceria-based powder as a co-catalyst.

For example, PTL 1 discloses a composite oxide in which a solid solution is formed from ceria, a metal or an oxide of at least one element selected from zirconia and iron, and a metal or an oxide of at least one element selected from silver and praseodymium. This composite oxide does not use noble metals, such as platinum, and is thus provided as an inexpensive catalyst. However, expensive elements, such as silver and praseodymium, are used in the catalyst disclosed in PTL 1 to impart catalytic activity; thus, there is a disadvantage that cost reduction is difficult.

Moreover, PTL 2 discloses a purifying catalyst comprising catalyst powder consisting of a transition metal oxide, and an oxygen release material. This purifying catalyst contains iron as the transition metal oxide, cerium as the oxygen release material, and zirconium as an inorganic oxide, and has a purifying action even though a noble metal is not used as an essential component. However, this purifying catalyst has limited efficiency of purifying exhaust gas.

Furthermore, PTL 3 discloses an exhaust purification catalyst comprising a particle containing a noble metal and a particle containing ceria and zirconia carrying an iron compound. This exhaust purification catalyst has high NOx conversion efficiency, and uses a less amount of noble metal than conventional catalysts. However, even though the amount of noble metal used can be reduced, it is necessary to use noble metal elements, such as rhodium; thus, this catalyst is disadvantageous in terms of cost.

PTL 4 discloses an auxiliary catalyst for cleaning flue gas in which a noble metal is supported on a composite oxide of $CeO_2$, $ZrO_2$, and a metal oxide that does not react with $CeO_2$ or $ZrO_2$, wherein the composite oxide has a pyrochlore phase where Ce and Zr are regularly arranged. In this composite oxide, the metal oxide intervenes between ceria and zirconia in the composite oxide as a barrier, which suppresses grain growth. The composite oxide thus has a high specific surface area. In particular, the composite oxide exhibits a high OSC because of the pyrochlore phase where Ce and Zr are regularly arranged. However, the catalytic activity of the composite oxide is likely to decrease after a heat treatment at a high temperature, and high temperature durability is problematic.

In addition, PTL 5 discloses a catalyst system comprising exhaust emission control catalysts including a first catalyst supported on an inorganic structure carrier, and a second catalyst (cerium-zirconium-based composite oxide) different from the first catalyst. PTL 5 also discloses that the cerium-zirconium-based composite oxide, which is the second catalyst, can be produced by heating and melting a mixture of raw materials of the composite oxide at a temperature equal to or higher than the melting point thereof, cooling the molten material to thereby obtain an ingot, and grinding the ingot. The catalyst system using exhaust emission control catalysts including such a composite oxide can particularly efficiently purify NOx. However, even this exhaust emission control catalyst has limited purification efficiency, and there is still a room for further improvement.

CITATION LIST

Patent Literature

PTL 1: JP2005-305363A
PTL 2: JP2010-104973A
PTL 3: JP2012-135716A
PTL 4: JP2003-073123A
PTL 5: JP2008-068225A

SUMMARY OF INVENTION

Technical Problem

Although various composite oxides for exhaust gas purifying catalysts were proposed, as disclosed in PTL 1 or PTL 5 mentioned above, there was still room for improvement in their exhaust eras purification performance. There was another problem in that composite oxides containing a noble metal increased production costs. Furthermore, the OSC of the composite oxides disclosed in the above patent literature had the possibility of decreasing when they were exposed to a high temperature, and their heat resistance was problematic.

The present invention has been made in view of the above problems. An object of the present invention is to provide a cerium-zirconium-based composite oxide that has a pyrochlore phase stably present in the crystal structure even when the composite oxide is exposed to a high temperature for a long period of time, and that has a high OSC and excellent exhaust gas purification performance; and to also provide a method for producing the cerium-zirconium-based composite oxide.

Solution to Problem

As described above, development of composite oxides for exhaust gas purifying catalysts containing a less amount of noble metal has been actively promoted; however, there are no sufficient studies for composite oxides in which noble metals are not mixed, but a third element other than noble metals is directly mixed. Accordingly, the present inventors focused on the above points, and studied to further improve the purification performance of composite oxides by, for example, mixing a third element into a cerium-zirconium-based composite oxide, and performing specific steps in the production of the composite oxide. As a result of extensive research, the present inventors found that the above object can be achieved by a cerium-zirconium composite oxide in which a specific crystal structure is maintained even when the composite oxide is exposed to a high temperature for a long period of time. Thus, the present invention has been completed.

Specifically, the present invention relates to the following cerium-zirconium-based composite oxide and method for producing the same.

1. A cerium-zirconium-based composite oxide comprising cerium, zirconium, and a third element other than these elements;
   wherein the third element is
   (a) a transition metal element or
   (b) at least one or more elements selected from the group consisting of rare earth elements and alkaline earth metal elements; and
   after a heat treatment at 1,000° C. to 1,100° C. for 3 hours,
   (1) the composite oxide has a crystal structure containing a pyrochlore phase,
   (2) when the peak intensity of a (111) plane measured by an X-ray diffraction method is regarded as I111, and the peak intensity of a (222) plane is regarded as I222, a value of $\{I111/(I111+I222)\} \times 100$ is 1 or more, and
   (3) the composite oxide has an oxygen storage capacity at 600° C. of 0.05 mmol/g or more, and an oxygen storage capacity at 750° C. of 0.3 mmol/g or more.

2. The cerium-zirconium-based composite oxide according to item 1, wherein the third element is (a) a transition metal element; and
   after a heat treatment at 1,000° C. to 1,100° C. for 3 hours, the composite oxide has an oxygen storage capacity at 600° C. of 0.3 mmol/g or more, and an oxygen storage capacity at 750° C. of 0.4 mmol/g or more.

3. The cerium-zirconium-based composite oxide according to item 2, wherein the transition metal element (a) is at least one or more members selected from the group consisting of iron, manganese, cobalt, nickel, and copper.

4. The cerium-zirconium-based composite oxide according to item 2 or 3, wherein the transition metal element is contained in an amount of 0.01 to 10 mol % in terms of oxide.

5. The cerium-zirconium-based composite oxide according to item 1, wherein the third element is (b) at least one or more elements selected from the group consisting of rare earth elements and alkaline earth metal elements; and
   after a heat treatment at 1,000° C. to 1,100° C. for 3 hours, the composite oxide has an oxygen storage capacity at 450° C. of 0.01 mmol/g or more.

6. The cerium-zirconium-based composite oxide according to item 5, wherein the rare earth element is at least one or more members selected from the group consisting of lanthanum, neodymium, praseodymium, and yttrium; and
   the alkaline earth metal element is at least one member selected from calcium and magnesium.

7. The cerium-zirconium-based composite oxide according to item 5 or 6, wherein the at least one or more elements selected from the group consisting of rare earth elements and alkaline earth metal elements (b) are contained in an amount of 0.01 to 30 mol % in terms of oxide.

8. The cerium-zirconium-based composite oxide according to any one of items 1 to 7, wherein the cerium and the zirconium are contained at a molar ratio of $CeO_2:ZrO_2=1:9$ to 9:1 in terms of oxide.

9. A method for producing the cerium-zirconium-based composite oxide according to any one of items 1 to 8, the method comprising the following steps (1) to (5):
   (1) step 1 of preparing a starting material comprising a cerium raw material, a zirconium raw material, a third element raw material other than these materials, wherein the third element raw material is:
   (a) a transition metal element raw material or
   (b) at least one material selected from the group consisting of rare earth element raw materials and alkaline earth metal element raw materials;
   (2) step 2 of heating the starting material at a temperature at or above a melting point by heating with an electric energy of 600 to 800 kWh/kg in terms of electric power consumption, and then heating with an electric energy of 800 to 1,000 kMh/kg in terms of electric power consumption, thereby obtaining a molten material;
   (3) step 3 of gradually cooling the molten material to form an ingot;
   (4) step 4 of grinding the ingot into a powder; and
   (5) step 5 of heating the powder at 700 to 1,100° C.

Advantageous Effects of Invention

The cerium-zirconium-based composite oxide of the present invention has a specific crystal structure even after a heat treatment at 1,000° C. to 1,100° C. for 3 hours. Accordingly, the composite oxide is a material having high heat resistance, and has an excellent OSC and high catalytic activity before and after a heat treatment.

Moreover, according to the production method of the present invention, the distance between the metals in the obtained composite oxide is small, and the degree of solid solution is high; therefore, a cerium-zirconium-based composite oxide in which a pyrochlore phase is stably present can be easily obtained. Furthermore, the composite oxide obtained by the above production method has an excellent OSC and high catalytic activity.

DESCRIPTION OF EMBODIMENTS

Figure 1:
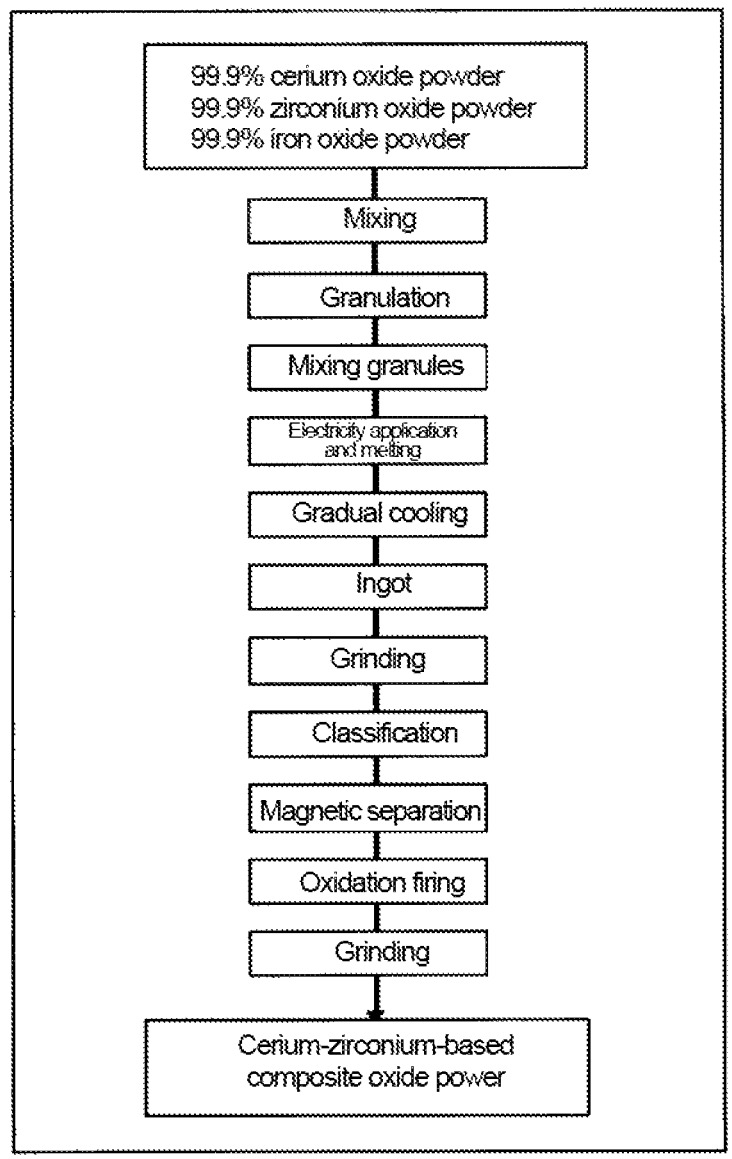
FIG. 1 is a flowchart showing an example of the process for producing the cerium-zirconium-based composite oxide of the present invention.

Embodiments of the present invention are described in detail below. In the present specification, "%" indicates "wt %=mass %" unless otherwise particularly specified.

1. Cerium-Zirconium-Based Composite Oxide

The cerium-zirconium-based composite oxide comprises cerium, zirconium, and a third element other than these elements. The third element is (a) a transition metal element or (b) at least one or more elements selected from the group consisting of rare earth elements and alkaline earth metal elements. Moreover, the cerium-zirconium-based composite oxide characteristically has the following structures (1) to (3) when it is heated in a temperature range of 1,000° C. to 1,100° C. for 3 hours:

(1) the composite oxide has a crystal structure containing a pyrochlore phase;

(2) when the peak intensity of a (111) plane measured by an X-ray diffraction method is regarded as I111, and the peak intensity of a (222) plane is regarded as I222, a value of $\{I111/(I111+I222)\} \times 100$ is 1 or more; and (3) the composite oxide has an oxygen storage capacity at 600° C. of 0.05 mmol/g or more, and an oxygen storage capacity at 750° C. of 0.3 mmol/g or more.

The cerium-zirconium-based composite oxide with the above structures has an excellent OSC, high catalytic activity, and high heat resistance.

From here on, "cerium-zirconium-based composite oxide" is abbreviated as "composite oxide." Further, "oxygen storage capacity" is abbreviated as "OSC."

Moreover, the composite oxide wherein the third element is a transition metal element (a) is referred to as the "composite oxide of the first embodiment," and the composite oxide wherein the third element is at least one or more elements selected from the group consisting of rare earth elements and alkaline earth metal elements (b) is referred to as the "composite oxide of the second embodiment." The simple expression "composite oxide" refers to "the composite oxide of the first embodiment" and or "the composite oxide of the second embodiment," or both.

The composite oxide of the first embodiment is a compound that comprises at least cerium (Ce), zirconium (Zr), and a transition metal element (a) other than Ce and Zr as essential elements, and that is formed as a composite of several types of oxides.

The above transition metal element is not particularly limited. Examples thereof include vanadium, chromium, manganese, iron, cobalt, nickel, copper, zinc, and the like. The transition metal element contained in the composite oxide of the first embodiment may be a single element, or a mixture of two or more elements. In particular, the transition metal element is preferably at least one or more members selected from the group consisting of iron, manganese, cobalt, nickel, and copper. In this case, the composite oxide exhibits higher catalytic activity, and has further increased heat resistance. Iron is a particularly preferred transition metal element.

The content ratio of the transition metal element contained in the composite oxide of the first embodiment is not particularly limited. For example, the content ratio can be 0.01 to 10 mol % in terms of oxide. In this case, there is less possibility that the OSC decreases to reduce catalytic activity. Further, in the production of the composite oxide of the first embodiment, defects, such as a reduction in the dispersibility of the transition metal element, are less likely to occur. Therefore, when the content ratio of the transition metal element in the composite oxide of the first embodiment is within the above range, the OSC of the composite oxide can be improved to increase catalytic activity and further increase heat resistance. The content ratio of the transition metal element contained in the composite oxide of the first embodiment is preferably 0.05 to 5 mol %, and more preferably 0.1 to 1 mol %.

On the other hand, the composite oxide of the second embodiment is a compound that comprises at least cerium (Ce), zirconium (Zr), and at least one or more elements selected from the group consisting of rare earth elements and alkaline earth metal elements (b) other than cerium, and that is formed as a composite of several types of oxides.

From here on, at least one or more elements selected from the group consisting of rare earth elements and alkaline earth metal elements other than cerium are also referred to simply as "the element (b)."

The above rare earth element is not particularly limited. Examples thereof include scandium, yttrium, lanthanum, praseodymium, neodymium, promethium, samarium, europium, gadolinium, terbium, dysprosium, holmium, erbium, thulium, ytterbium, lutetium, and the like. The rare earth element contained in the composite oxide of the second embodiment may be a single element or a mixture of two or more elements. The rare earth element is preferably at least one or more members selected from the group consisting of lanthanum, neodymium, praseodymium, and yttria. In this case, the composite oxide exhibits higher catalytic activity, and has further increased heat resistance. Lanthanum or yttria is a particularly preferred rare earth element.

Moreover, the above alkaline earth metal element is not particularly limited. Examples thereof include strontium, calcium, magnesium, and the like. Among these, the alkaline earth metal element is preferably at least one of calcium and magnesium. In this case, the composite oxide of the second embodiment exhibits higher catalytic activity, and has further increased heat resistance.

The content ratio of the element (b) contained in the composite oxide of the second embodiment is not particularly limited. For example, the content ratio can be 0.01 to 30 mol % in terms of oxide. In this case, there is less possibility that the OSC decreases to reduce catalytic activity. Further, in the production of the composite oxide of the second embodiment, defects, such as difficulty in obtaining target fired materials, are less likely to occur. Therefore, when the content ratio of the third element in the composite oxide of the second embodiment is within the above range, the OSC of the composite oxide can be improved to increase catalytic activity and further increase heat resistance. The content ratio of the third element contained in the composite oxide of the second embodiment is preferably 0.01 to 20 mol %, more preferably 0.01 to 10 mol %, and even more preferably 0.1 to 1 mol %.

The contents of cerium and zirconium contained in the composite oxides of the first and second embodiments are not limited. For example, their contents can be determined so that the molar ratio of cerium and zirconium is 1:9 to 9:1 (i.e., $CeO_2:ZrO_2=1:9$ to 9:1) in terms of oxide. Because the molar ratio ($CeO_2:ZrO_2$) of cerium and zirconium in terms of oxide is within the above range, the composite oxide has a more excellent OSC, exhibits high catalytic activity, and has improved heat resistance. The molar ratio of cerium and zirconium is preferably 2:8 to 8:2 (i.e., $CeO_2:ZrO_2=2:8$ to 8:2), more preferably 3:7 to 7:3 (i.e., $CeO_2:ZrO_2=3:7$ to 7:3), and particularly preferably 4:6 to 6:4 (i.e., $CeO_2:ZrO_2=4:6$ to 6:4).

The composite oxide may contain elements other than cerium, zirconium, and the third element, as loner as the OSC, catalytic activity, and heat resistance of the composite oxide are not impaired. The composite oxide may inevitably contain impurities, such as hafnium oxide.

The crystal structure of the composite oxides of the first and second embodiments has a pyrochlore phase-type regular arrangement phase. Accordingly, the composite oxides have high heat resistance, and have a higher level of OSC even after they are exposed to a high temperature. The composite oxides may contain a crystal phase other than the pyrochlore phase, as long as the OSC, catalytic activity, and heat resistance are not impaired.

In the composite oxides of the first and second embodiments, when the peak intensity of a (111) plane measured by an X-ray diffraction method is regarded as I111, and the peak intensity of a (222) plane is regarded as I222, the value of the formula $\{I111/(I111+I222)\} \times 100$ is 1 or more. The (111) plane and the (222) plane are displayed as the Miller index. The Miller index refers to an index for describing the crystal plane and direction in the crystal lattice. For the above composite oxides, in an X-ray chart obtained by measurement using an X-ray diffraction method, a diffraction peak appearing at $2\theta=14$ to $15°$ can be regarded as the (111) plane, and a diffraction peak appearing at $2\theta=28.5$ to $30.5°$ can be regarded as the (222) plane.

From here on, the formula $\{I111/(I111+I222)\} \times 100$ is also referred to simply as "T value."

When the T value is 1 or more, the crystal structure of the composite oxide contains a pyrochlore phase. Further, even after the composite oxide is heated at a high temperature, e.g., in a temperature range of 1,000° C. to 1,100° C., for 3 hours, the OSC is less likely to decrease, and the composite oxide has high heat resistance. When the T value is 0, the crystal structure of the composite oxide cannot contain a pyrochlore phase. The T value is particularly preferably 2 or more. In this case, the OSC is more excellent, and the heat resistance is further improved.

The change in the crystal structure of the composite oxide before and after a heat treatment can be determined by an X-ray diffraction method (XRD) using an X-ray diffraction apparatus. For example, when a sharp peak is observed at around $2\theta/°=15$ in an X-ray chart obtained by XRD of the composite oxide, it can be determined that the crystal structure of the composite oxide contains a pyrochlore phase. The specific analysis of the crystal structure from the X-ray chart obtained by XRD is described in detail in Examples, provided later.

The specific surface area of the composite oxides of the first and second embodiments is not limited, but is about 0.1 to 50 $m^2/g$. It is generally considered that the OSC of a composite oxide increases in proportion to its specific surface area. The specific surface area of the composite oxides of the first and second embodiments is much smaller than that of conventional cerium-zirconium-based composite oxides. Nevertheless, the composite oxides of the first and second embodiments both have an excellent OSC. The reason for this is considered to be that the composite oxides contain cerium, zirconia, and a third element, and the third element is in a solid solution state in the composite oxides, allowing a pyrochlore phase to be stably present in their crystal structure. It is also considered that because the pyrochlore phase is stable in the crystal structure, the OSC is less likely to decrease even after a high-temperature heat treatment, and that consequently, the heat resistance is improved. The third element may be entirely or partially in a solid solution state in the composite oxides.

The composite oxide of the first embodiment can have an OSC at 600° C. of 0.3 mmol/g or more, and an OSC at 750° C. of 0.4 mmol/g or more. Moreover, in the composite oxide of the first embodiment, the oxygen absorption and release initiation temperature before heat treatment is 700° C. or less, and the oxygen absorption and release initiation temperature after a heat treatment at 1,000° C. to 1100° C. for 3 hours is 400° C. or less. Because the oxygen absorption and release initiation temperature of the composite oxide before heat treatment is 700° C. or less, the oxygen storage function works even in a low temperature region. A particularly noteworthy point is that the oxygen absorption and release initiation temperature is 400° C. or less after a heat treatment at 1,000° C. to 1,100° C. for 3 hours, that is, after a heating resistance test is conducted, and that the oxygen storage function can work even at a lower temperature than the temperature before the heating resistance test.

Moreover, even after the composite oxide of the first embodiment is heated at 1,000° C. to 1100° C. for 3 hours, the OSC can be 0.3 mmol/g or more at 600° C., and 0.4 mmol/g or more at 750° C. Therefore, the composite oxide of the first embodiment can be a material that can maintain a high OSC even after a heating endurance test is conducted.

On the other hand, the composite oxide of the second embodiment can have an OSC at 450° C. of 0.01 mmol/g or more, an OSC at 600° C. of 0.05 mmol/g or more, and an OSC at 750° C. of 0.3 mmol/g or more. Moreover, in the composite oxide of the second embodiment, the oxygen absorption and release initiation temperature before heat treatment is 600° C. or less, and the oxygen absorption and release initiation temperature after a heat treatment at 1,000° C. to 1,100° C. for 3 hours is 500° C. or less. Because the oxygen absorption and release initiation temperature of the composite oxide before heat treatment is 600° C. or less, the oxygen storage function works even in a low temperature region. Similar to the first embodiment, a particularly noteworthy point is that the oxygen absorption and release initiation temperature is 500° C. or less after a heat treatment at 1,000° C. to 1,100° C. for 3 hours, that is, after a heating resistance test is conducted, and that the oxygen storage function can work even at a lower temperature than the temperature before the heating resistance test.

Moreover, even after the composite oxide of the second embodiment is heated at 1,000° C. to 1,100° C. for 3 hours, the OSC at 450° C. can be 0.01 mmol/g or more. Therefore, the composite oxide of the second embodiment can be a material that can maintain a high OSC even after a heating endurance test is conducted.

Because a pyrochlore phase is stably present in the composite oxides of both the first and second embodiments, as described above, they have an excellent OSC and consequently exhibit high catalytic activity, even though they do not contain noble metal elements. Furthermore, because the crystal structure is stable even after a heat treatment at 1,000° C. to 1,100° C. for 3 hours, they can maintain a high OSC even after the heat treatment, and can be materials having high heat resistance. Therefore, the above composite oxides are materials that can be applied to various catalysts, such as exhaust gas purifying catalysts, and can be suitably used as OSC agents for building high-performance purifying systems.

The OSC of the cerium-zirconium-based composite oxide can be measured in the following manner. First, the oxygen release initiation temperature and the amount of oxygen released can be determined by temperature-programmed reduction using hydrogen, which is called $H_2$-TPR. In this measurement, a commercially available measuring device (BEL Japan Inc., "Multitask T.P.R.") can be used. Further, the amount of oxygen absorbed can be determined by the $O_2$ pulse method.

For example, the amount of oxygen absorbed can be measured through the following processes (a) to (g) in this order:

(a) The composite oxide is ground to form a powder, and 0.2 g of the powder is weighed.

(b) The weighed powder is set in a flow-type reactor, the temperature of the atmosphere is raised to 600° C. in a He flow, and the temperature is maintained for 1 hour.

(c) The temperature of the composite oxide is adjusted to a predetermined temperature.

(d) A predetermined amount of oxygen is introduced into the atmosphere.

(e) The amount of unabsorbed oxygen is confirmed with a thermal conductivity detector (TCD).

(f) The introduction of a predetermined amount of oxygen into the atmosphere in (d), and the confirmation of the amount of unabsorbed oxygen in (e) are repeated until the amount of oxygen introduced and the amount of unabsorbed oxygen are equivalent.

(g) The amount of oxygen absorbed, i.e., the OSC amount, is calculated by calculation. This calculation can be conducted by subtracting the amount of unabsorbed oxygen from the previously determined amount of oxygen introduced.

2. Method for Producing Cerium-Zirconium-Based Composite Oxide

Next, embodiments of the method for producing the above composite oxides are described. The production method of the present invention is not limited to these embodiments.

The composite oxides can be produced by a production process comprising steps 1 to 5 in the following (1) to (5):

(1) step 1 of preparing a starting material comprising a cerium raw material, a zirconium raw material, a third element raw material other than these materials, wherein the third element raw material is:

(a) a transition metal element raw material or (b) at least one material selected from the group consisting of rare earth element raw materials and alkaline earth metal element raw materials;

(2) step 2 of heating the starting material at a temperature at or above a melting point by heating with an electric energy of 600 to 800 kWh/kg in terms of electric power consumption, and then heating with an electric energy of 800 to 1,000 kWh/kg in terms of electric power consumption, thereby obtaining a molten material;

(3) step 3 of gradually cooling the molten material to form an ingot;

(4) step 4 of grinding the ingot into a powder; and (5) step 5 of heating the powder at 700 to 1,100° C. Each step is described in detail below.

Step 1

Step 1 is a step of preparing a starting material comprising a cerium raw material, a zirconium raw material, and a third element raw material other than cerium and zirconium. The third element raw material is (a) a transition metal element raw material or (b) at least one or more element raw materials selected from the group consisting of rare earth element raw materials and alkaline earth metal element raw materials.

When a transition metal element raw material (a) is used as the third element raw material in step 1, the composite oxide of the first embodiment can be produced. When at least one member selected from the group consisting of rare earth element raw materials and alkaline earth metal element raw materials (b) is used as the third element raw material in step 1, the composite oxide of the second embodiment can be produced.

The cerium raw material used in step 1 is a material for introducing a cerium element into the composite oxide. The cerium raw material is not particularly limited, but is preferably cerium oxide. The cerium oxide can be synthesized from various raw materials, such as nitrate, carbonate, sulfate, acetate, chloride, and bromide. Moreover, the cerium raw material may be a composite oxide of cerium and an element including at least one of zirconium and a transition metal element. The cerium raw material may contain a compound such as nitrate, carbonate, sulfate, chloride, or bromide of cerium or zirconium.

The zirconium raw material used in step 1 is a material for introducing a zirconium element into the composite oxide. The zirconium raw material is not particularly limited. Examples thereof include various zirconium-based materials, such as baddeleyite, desiliconized zirconia, and zirconium oxide; zirconium materials containing zirconium oxide; and the like. Zirconium oxide can be synthesized from various raw materials, such as nitrate, carbonate, sulfate, acetate, chloride, and bromide. Moreover, the zirconium raw material may be a composite oxide of zirconium and an element including at least one of cerium and a transition metal element. The zirconium raw material may contain a compound, such as nitrate, carbonate, sulfate, chloride, or bromide of cerium or zirconium.

The third element raw material used in step 1 is a material for introducing a third element into the composite oxide. Among the third element raw materials, the transition metal element raw material is a material for introducing a transition metal element into the composite oxide, the rare earth element raw material is a material for introducing a rare earth element into the composite oxide, and the alkaline earth metal element raw material is a material for introducing an alkaline earth metal element into the composite oxide. From here on, the rare earth element raw materials or alkaline earth metal elements are also collectively referred to as "the element raw material (b)."

The transition metal element raw material is not particularly limited. Examples thereof include at least one or more transition metals selected from the group consisting of vanadium, chromium, manganese, iron, cobalt, nickel, copper, and zinc. Alternatively, for example, a compound such as an oxide containing at least one element selected from these transition metals may be used as the transition metal element raw material. In particular, the transition metal element raw material is preferably at least one or more members selected from the group consisting of iron, manganese, cobalt, nickel, and copper; or an oxide containing at least one of these elements. For example, when the transition metal element raw material is a compound containing an iron element, iron oxide is preferable. The iron oxide can be synthesized from various raw materials, such as nitrate, carbonate, sulfate, acetate, chloride, and bromide. Moreover, the transition metal element raw material may be a composite oxide of a transition metal element and an element including at least one of cerium and zirconium.

The rare earth element (except for cerium) raw material is not particularly limited. Examples thereof include at least one or more materials selected from the group consisting of scandium, yttrium, lanthanum, praseodymium, neodymium, promethium, samarium, europium, gadolinium, terbium, dysprosium, holmium, erbium, thulium, ytterbium, and lutetium. Alternatively, the rare earth element raw material may be a compound such as an oxide containing at least one element selected from the materials listed above. The rare earth element raw material is more preferably at least one or more materials selected from the group consisting of lanthanum, neodymium, praseodymium, and yttria; or an oxide containing at least one of these elements. In this case, the obtained composite oxide exhibits higher catalytic activity and has increased heat resistance. The rare earth element raw material is particularly preferably at least one or more members selected from the group consisting of lanthanum, yttrium, lanthanum oxide, and yttria. Lanthanum oxide can be synthesized from various raw materials, such as nitrate, carbonate, sulfate, acetate, chloride, and bromide. Yttrium oxide can also be synthesized from various raw materials, such as nitrate, carbonate, sulfate, acetate, chloride, and bromide.

The alkaline earth metal element raw material is also not particularly limited. Examples thereof include strontium, calcium, magnesium, and the like. Alternatively, the alkaline earth metal element raw material may be a compound such as an oxide containing at least one element selected from the materials listed above. The alkaline earth metal element raw material is more preferably at least one or more materials selected from the group consisting of strontium, calcium, and magnesium; or at least one or more oxides selected from the group consisting of strontium oxide, calcium oxide, and magnesium oxide. In this case, the obtained composite oxide exhibits higher catalytic activity and has increased heat resistance. Calcium oxide and magnesium oxide can be synthesized from various raw materials, such as nitrate, carbonate, sulfate, acetate, chloride, and bromide.

The rare earth element raw material may be a composite oxide of a rare earth element, an element including at least one of cerium and zirconium, and an alkaline earth metal element. Similarly, the alkaline earth metal element raw material may be a composite oxide of an alkaline earth metal element, an element including at least one of cerium and zirconium, and a rare earth element.

Although the purity of the cerium raw material, zirconium raw material, and third element raw material is not particularly limited, the purity is preferably 99.9% or more because the purity of the target product can be increased. Each of the cerium raw material, zirconium raw material, and third element raw material may contain other substances, as long as the characteristics of the composite oxide are not impaired. Examples of other substances include nitrate, carbonate, sulfate, chloride, bromide, or the like of cerium or zirconium.

The combination of the cerium raw material, zirconium raw material, and third element raw material is preferably such that, when the above raw materials are heated in a step following step 1, that is, step 3, described later, at least one of the raw materials is melted. In this case, the crystal structure of the composite oxide to be produced easily forms a pyrochlore phase, and the OSC of the obtained composite oxide can be further improved. For example, it is known that the melting point of cerium oxide is 2,200° C., and the melting point of zirconium oxide is 2,720° C. Moreover, the melting point of an oxide is a relatively high temperature. When cerium oxide and zirconium oxide are used as the cerium raw material and the zirconium raw material, respectively, due to the influence of decrease in the melting point, a molten state may be able to be obtained even by heating at a temperature lower than the melting point of a single oxide.

In step 1, a starting material can be obtained by preparing predetermined amounts of the above cerium raw material, zirconium raw material, and third element raw material, and mixing them. The method of mixing the raw materials is not particularly limited. The thus-obtained starting material is, for example, a mixture of various oxides mentioned above, or a composite oxide comprising cerium, zirconium, and the third element.

Step 2

Step 2 is a step of melting the starting material prepared in step 1 by applying a predetermined amount of heat to the starting material using a melting apparatus, etc. In this step, at least one of the raw materials, i.e., the cerium raw material, zirconium raw material, and third element raw material, may be melted; it is particularly preferable that all of the raw materials are melted. In this case, the obtained composite oxide has a stable crystal structure, and can have a high OSC. All of the raw materials can be melted by applying heat to the starting material so that the temperature is equal to or higher than the highest melting point among the melting points of the raw materials contained in the starting material.

The method of melting the starting material is not particularly limited. Examples of the melting method include an arc-melting method, a high-frequency heat plasma method, and the like. Of these, a general electric melting method, i.e., a melting method that uses an arc electric furnace, is preferably employed.

The starting material may be heated by, for example, applying heat with an electric energy of 600 to 800 kWh/kg in terms of electric power consumption, and then applying heat with an electric energy of 800 to 1,000 kWh/kg in terms of electric power consumption. As a result of the heating, the starting material can be heated to a temperature higher than the highest melting point among the melting points of the raw materials contained in the starting material, and a molten material of the starting material can be obtained.

As described above, step 2 includes a two-step heating process. The starting material may be almost melted in the first heating step, and the starting material may be completely melted in the subsequent second heating step. Without such a two-step heating process, the eventually obtained composite oxide may hardly form a crystal structure containing a pyrochlore phase, and a composite oxide having an excellent OSC may not be obtained. Further, without such a two-step heating process, it is difficult to sufficiently melt the composite oxide, and the composite oxide is in a uneven state as a whole. As a result, the specific surface area of the obtained composite oxide shows variation, and sufficient catalytic activity cannot be obtained.

Moreover, when an arc electric furnace is used as the melting apparatus, damage to the apparatus can be minimized by dividing the heating process into two steps, as described above, and there is also an advantage that, heating can be performed safely and sufficiently. Specifically, when the starting material containing cerium oxide is heated and melted, the following chemical reaction: "$CeO_2 \rightarrow 1/2\ Ce_2O_3 + 1/4\ O_2$" occurs in the melting apparatus.

Figure 9:
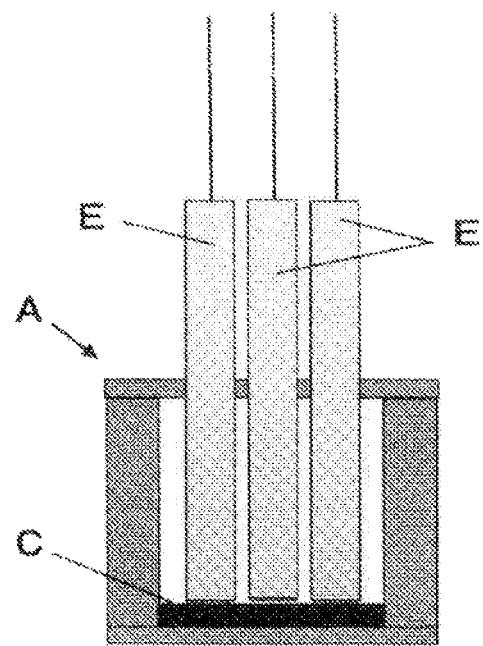
FIG. 9 is a schematic explanatory view shoving an example of a melting apparatus (an arc electric furnace) used to produce the cerium-zirconium-based composite oxide of the present invention.

As shown in FIG. 9, an arc electric furnace A generally has a carbon layer C on the bottom surface. In the beginning of heating, the carbon layer C and electrodes E provided in the arc electric furnace A are in contact with each other. When the melting reaction proceeds, the molten material enters between the carbon layer C and the electrodes E; therefore, the position of the electrodes E is adjusted so that the electrodes E are gradually separated from the carbon layer C. In the melting step, oxygen generated in the chemical reaction of cerium oxide reacts with the carbon layer C to form carbon dioxide, thereby leading to a phenomenon that the carbon layer C is corroded. When the carbon layer C is thus corroded, a hole is formed in the carbon layer C; therefore, the risk of leakage of the molten material increases, and it is necessary to exchange the carbon layer C. Therefore, in the first heating step, heating is gently performed so that the molten material enters between the carbon layer C and the electrodes E. Next, the position of the electrodes E is adjusted, and when the distance between the carbon layer C and the electrodes E is sufficiently apart, the second heating step is performed.

Due to such a heating method, heating can be safely performed, and damage to the apparatus can be suppressed. Further, a uniform molten material, i.e., a molten material in which the raw materials are uniformly mixed, can be obtained.

The amount of electric energy applied in the first heating step is preferably 625 to 775 kWh/kg, and more preferably 650 to 750 kWh/kg, in terms of electric power consumption. In the first heating step, it is preferable to apply electric energy for 1 to 3 hours. Moreover, the amount of electric energy applied in the second heating step is 825 to 975 kWh/kg, and more preferably 850 to 950 kWh/kg, in terms of electric power consumption. In the second heating step, it is preferable to apply electric energy for 6 to 10 hours, preferably 6 to 8 hours, and more preferably 7 to 8 hours. When the above electric energy amounts and heating time are employed, the eventually obtained composite oxide easily forms a crystal structure containing a pyrochlore phase, and has a further improved OSC and excellent catalytic activity.

When the melting method using an arc electric furnace is employed, a predetermined amount of a conductive material, such as coke, may be previously added to the starting material before heating is performed, in order to facilitate the initial energization. However, the amount of coke added, etc., are suitably changed depending on the mixing ratio of the raw materials used in step 1.

The atmosphere during the melting of the starting material in step 2 is not particularly limited; the melting may be performed in air, a nitrogen atmosphere, or an inert gas atmosphere, such as argon or helium. The pressure during the melting is also not particularly limited, and may be atmospheric pressure, increased pressure, or reduced pressure. Usually, an atmospheric pressure is applied.

Step 3

Step 3 is a step of gradually cooling the molten material obtained in step 2 to form an ingot.

The method of forming an ingot is not particularly limited. For example, when the melting of step 3 is performed in an electric furnace, the electric furnace is covered with a carbon lid, and the molten material is gradually cooled over 20 to 60 hours. The time of gradual cooling is preferably 30 to 50 hours, more preferably 35 to 45 hours, and even more preferably 35 to 40 hours. Moreover, the molten material may be gradually cooled, for example, in air so that the temperature of the molten material is 100° C. or less, and preferably 50° C. or less. When there is a possibility that the temperature of the molten material rapidly decreases, and that the time of gradual cooling is shorter than 20 to 60 hours, a rapid temperature decrease in the molten material can be avoided by, for example, suitably heating the molten material in the gradual cooling step.

When the molten material is gradually cooled while avoiding a rapid temperature decrease in the molten material in the gradual cooling step, as described above, the elements contained in the raw materials are likely to form a solid solution. This enables the eventually obtained composite oxide to easily form a crystal structure having a stable pyrochlore phase even in a high temperature region.

Step 4

Step 4 is a step of grinding the ingot obtained in step to form a powder.

The method of grinding the ingot is not particularly limited. For example, the ingot is ground by a grinder, such as a jaw crusher or a roll crusher. The grinding may be performed by using a plurality of grinders in combination. In terms of the handling of the powder in the subsequent step, the ingot may be ground so that the ground powder has an average particle diameter of 3 mm or less, and preferably 1 mm or less. The ground ingot may be classified. For example, a sieve can be used to collect a powder having a desired average particle diameter.

Step 5

Step 5 is a step of heating the powder obtained in step 4 in an atmosphere of 700 to 1,100° C.

When the above heating is performed, it is preferable to previously subject the powder to magnetic separation to separate impurities, etc. Then, the powder may be heated using, for example, an electric furnace, in an atmosphere of 700 to 1,100° C. The powder is heated and fired by this heating, and suboxides formed in the melting step or strains induced in the crystal due to supercooling in step 3 can be removed. The heating temperature is preferably 700° C. to 1,000° C., and more preferably 600° C. to 900° C. In either case, the suboxides and the strains within the crystal are more likely to be removed. Moreover, the heating time is not particularly limited, but can be, for example, 1 to 5 hours, and preferably 2 to 3 hours. The heating may be performed in air or in an oxygen atmosphere.

In step 5, a solid or powdery composite oxide is obtained as a product. The product may be further finely ground using a grinder, such as a planetary mill, a ball mill, or a jet mill, depending on the application purpose of the composite oxide. When the product is finely ground, the product may be treated by a grinder mentioned above for about 5 to 30 minutes. Moreover, when the product is finely ground as described above, the average particle diameter of the composite oxide is, for example, 0.3 to 2.0 µm, and preferably 0.5 to 1.5 µm. The average particle diameter of the composite oxide can be measured by using a laser diffraction/scattering analyzer or the like.

As described above, a cerium-zirconium-based composite oxide can be produced in a simple manner through the production process comprising steps 1 to 5. According to the above production method, the starting material is heated to a molten state, and the eventually produced composite oxide is thereby obtained as a solid solution. The above production method essentially comprises steps 1 to 5, and may comprise other steps, as necessary.

In the composite oxide obtained by the above production method, the distance between the metals is small in the crystal structure, and the degree of solid solution is high; therefore, a pyrochlore phase is stably present therein. Accordingly, the OSC of the composite oxide obtained by the above production method is easily improved, and the composite oxide tends to exhibit high catalytic activity. Furthermore, because a pyrochlore phase is stably present, the oxygen storage capacity is excellent even when the composite oxide is heated at a high temperature (heat treatment at 1,000° C. to 1,100° C. for 3 hours). Specifically, the composite oxide of the first embodiment, which is produced by using a transition metal element raw material (a) as the third element raw material, has an oxygen storage capacity at 600° C. of 0.3 mmol/g or more, and an oxygen storage capacity at 750° C. of 0.4 mmol/g or more; thus, an excellent OSC is maintained. Furthermore, the composite oxide of the second embodiment, which is produced by using at least one member selected from the group consisting of rare earth element raw materials and alkaline earth metal element raw materials (b) as the third element raw material, has an OSC at 450° C. of 0.01 mmol/g or more, an OSC at 600° C. of 0.05 mmol/g or more, and an OSC at 750° C. of 0.3 mmol/g or more; thus, an excellent OSC is maintained.

Accordingly, the composite oxide obtained by the above production method is a material that can be suitably applied to various catalysts, such as exhaust gas purifying catalysts, and can be suitably used as an OSC agent for building a high-performance purifying system.

EXAMPLES

The present invention is described in more detail below with reference to Examples. However, the scope of the present invention is not limited to the following Examples. The materials obtained in the Examples and Comparative Example contain hafnium oxide as an inevitable impurity in an amount of 1 to 2 wt. % based on the amount of zirconium oxide.

Example 1

High-purity zirconium oxide (purity: 99.9%, produced by Daiichi Kigenso Kagaku Kogyo Co., Ltd.) as a zirconium raw material, and high-purity cerium oxide (purity: 99.9%, produced by Mitsuwa Chemicals Co., Ltd.) as a cerium raw material were prepared. Further, high-purity iron oxide (purity: 99.9%, produced by Wako Pure Chemical Ind. Ltd.) was prepared as a transition metal element raw material.

Production was performed according to the procedures of the production process shown in FIG. 1 using the above raw materials. First, the high-purity zirconium oxide (4.17 kg), the high-purity cerium oxide (5.82 kg), and the high-purity iron oxide (0.01 kg) were each taken, and these raw materials were mixed to obtain a starting material (step 1). Next, the starting material was melted in an arc electric furnace at 2,200° C. or more by heating for 2 hours with an electric energy of 650 kWh/kg in terms of electric power consumption, and then heating for 6 hours with an electric energy of 900 kWh/kg in terms of electric power consumption (step 2). The starting material was completely melted in this step. In the melting step, 500 g of coke was used in order to facilitate the initial energization.

After the completion of melting, the electric furnace was covered with a carbon lid, and the molten mixture was slowly cooled in air over a period of 24 hours to obtain an ingot (step 3). The thus-obtained ingot was ground to 3 mm or less using a jaw crusher and a roll crusher, and then sieved to collect a powder of 1 mm or less (step 4). Next, the obtained powder was subjected to a heat treatment in air in an electric furnace at 800° C. for 3 hours to remove suboxides formed in the preceding melting step or to remove strains induced in the crystal due to undercooling (step 5). The product obtained by the heat treatment was then ground for 10 minutes using a planetary mill to thereby obtain a powdery composite oxide.

Example 2

A composite oxide was produced in the same manner as in Example 1, except that in the preparation of the starting material, the amount of high-purity zirconium oxide was changed to 4.15 kg, the amount of high-purity cerium oxide was changed to 5.80 kg, and the amount of high-purity iron oxide was changed to 0.05 kg.

Example 3

A composite oxide was produced in the same manner as in Example 1, except that in the preparation of the starting material, the amount of high-purity zirconium oxide was changed to 4.06 kg, the amount of high-purity cerium oxide was changed to 5.67 kg, and the amount of high-purity iron oxide was changed to 0.27 kg.

Example 4

A composite oxide was produced in the same manner as in Example 1, except that in the preparation of the starting material, the amount of high-purity zirconium oxide was changed to 4.17 kg, the amount of high-purity cerium oxide was changed to 5.82 kg, and 0.12 kg of high-purity manganese oxide (produced by Mitsuwa Chemicals Co., Ltd.) was used in place of the high-purity iron oxide.

Example 5

A composite oxide was produced in the same manner as in Example 1, except that in the preparation of the starting material, the amount of high-purity zirconium oxide was changed to 4.17 kg, the amount of high-purity cerium oxide was changed to 5.82 kg, and 0.10 kg of high-purity nickel oxide (produced by Mitsuwa Chemicals Co., Ltd.) was used in place of the high-purity iron oxide.

Example 6

A composite oxide was produced in the same manner as in Example 1, except that in the preparation of the starting material, the amount of high-purity zirconium oxide was changed to 4.17 kg, the amount of high-purity cerium oxide was changed to 5.82 kg, and 0.11 kg of high-purity copper oxide (produced by Mitsuwa Chemicals Co., Ltd.) was used in place of the high-purity iron oxide.

Example 7

A composite oxide was produced in the same manner as in Example 1, except that in the preparation of the starting material, the amount of high-purity zirconium oxide was changed to 4.17 kg, the amount of high-purity cerium oxide was changed to 5.82 kg, and 0.11 kg of high-purity cobalt oxide (produced by Mitsuwa Chemicals Co., Ltd.) was used in place of the high-purity iron oxide.

Example 8

High-purity zirconium oxide (purity: 99.9%, produced by Daiichi Kigenso Kagaku Kogyo Co., Ltd.) as a zirconium raw material, and high-purity cerium oxide (purity: 99.9%, produced by Mitsuwa Chemicals Co., Ltd.) as a cerium raw material were prepared. Further, high-purity lanthanum oxide (purity: 99.9%, produced by Wako Pure Chemical Ind. Ltd.) was prepared as a rare earth element raw material.

Figure 2:
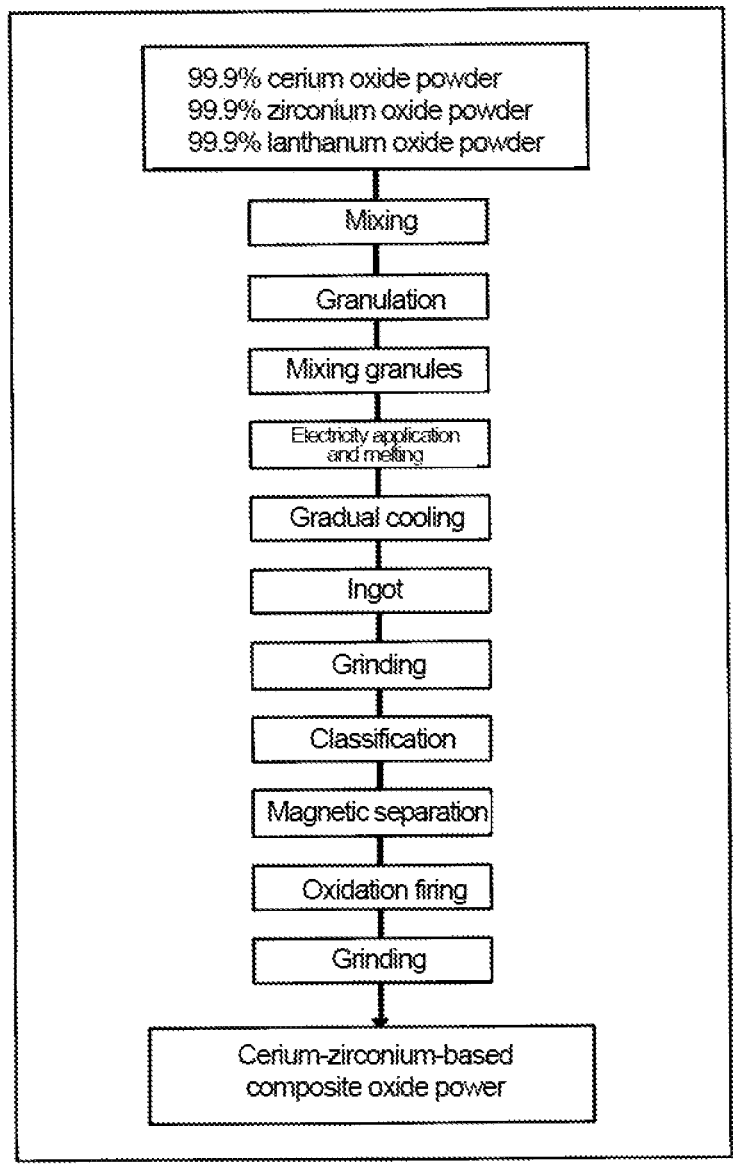
FIG. 2 is a flowchart showing another example of the process for producing the cerium-zirconium-based composite oxide of the present invention.

Production was performed according to the procedures of the production process shown in FIG. 2 using the above raw materials. First, the high-purity zirconium oxide (3.94 kg), the high-purity cerium oxide (5.51 kg), and the high-purity lanthanum oxide (0.55 kg) were each taken, and these raw materials were mixed to obtain a starting material (step 1). Next, the starting material was melted in an arc electric furnace at 2,200° C. or more by heating for 2 hours with an electric energy of 650 kWh/kg in terms of electric power consumption, and then heating for 6 hours with an electric energy of 900 kWh/kg in terms of electric power consumption (step 2). The starting material was completely melted in this step. In the melting step, 500 g of coke was used in order to facilitate the initial energization.

After the completion of melting, the electric furnace was covered with a carbon lid, and the molten mixture was slowly cooled in air over a period of 24 hours to obtain an ingot (step 3). The thus-obtained ingot was ground to 3 mm or less using a jaw crusher and a roll crusher, and then sieved to collect a powder of 1 mm or less (step 4). Next, the obtained powder was subjected to a heat treatment in air in an electric furnace at 800° C. for 3 hours to remove suboxides formed in the preceding melting step or to remove strains induced in the crystal due to undercooling (step 5). The product obtained by the heat treatment was then around for 10 minutes using a planetary mill to thereby obtain a powdery composite oxide.

Example 9

A composite oxide was produced in the same manner as in Example 8, except that in the preparation of the starting material, the amount of high-purity zirconium oxide was changed to 4.01 kg, the amount of high-purity cerium oxide was changed to 5.60 kg, and 0.39 kg of high-purity yttrium oxide (purity: 99.95%, produced by Wako Pure Chemical Ind. Ltd.) was used in place of the high-purity lanthanum oxide.

Example 10

A composite oxide was produced in the same manner as in Example 8, except that in the preparation of the starting material, the amount of high-purity zirconium oxide was changed to 4.01 kg, the amount of high-purity cerium oxide was changed to 5.60 kg, and 0.14 kg of high-purity magnesium oxide (purity: 99.9%, produced by Konoshima Chemical Co., Ltd.) was used as an alkaline earth metal element raw material in place of the high-purity lanthanum oxide.

Example 11

A composite oxide was produced in the same manner as in Example 8, except that in the preparation of the starting material, the amount of high-purity zirconium oxide was changed to 4.09 kg, the amount of high-purity cerium oxide was changed to 5.71 kg, and 0.36 kg of calcium carbonate (purity: 99%, produced by Konoshima Chemical Co., Ltd.) was used as an alkaline earth metal element raw material in place of the high-purity lanthanum oxide.

Example 12

A composite oxide was produced in the same manner as in Example 8, except that in the preparation of the starting material, the amount of high-purity zirconium oxide was changed to 4.18 kg, the amount of high-purity cerium oxide was changed to 5.60 kg, and the amount of high-purity lanthanum oxide was changed to 0.22 kg.

Example 13

A composite oxide was produced in the same manner as in Example 8, except that in the preparation of the starting material, the amount of high-purity zirconium oxide was changed to 4.19 kg, the amount of high-purity cerium oxide was changed to 5.26 kg, and the amount of high-purity lanthanum oxide was changed to 0.55 kg.

Example 14

A composite oxide was produced in the same manner as in Example 8, except that in the preparation of the starting material, the amount of high-purity zirconium oxide was changed to 4.20 kg, the amount of high-purity cerium oxide was changed to 4.69 kg, and the amount of high-purity lanthanum oxide was changed to 1.11 kg.

Example 15

A composite oxide was produced in the same manner as in Example 9, except that in the preparation of the starting material, the amount of high-purity zirconium oxide was changed to 4.21 kg, the amount of high-purity cerium oxide was changed to 5.64 kg, and the amount of high-purity yttrium oxide was changed to 0.15 kg.

Example 16

A composite oxide was produced in the same manner as in Example 9, except that in the preparation of the starting material, the amount of high-purity zirconium oxide was changed to 4.21 kg, the amount of high-purity cerium oxide was changed to 5.35 kg, and the amount of high-purity yttrium oxide was changed to 0.39 kg.

Example 17

A composite oxide was produced in the same manner as in Example 9, except that in the preparation of the starting material, the amount of high-purity zirconium oxide was changed to 4.35 kg, the amount of high-purity cerium oxide was changed to 4.86 kg, and the amount of high-purity yttrium oxide was changed to 0.79 kg.

Example 18

A composite oxide was produced in the same manner as in Example 8, except that in the preparation of the starting material, the amount of high-purity zirconium oxide was changed to 4.17 kg, the amount of high-purity cerium oxide was changed to 5.59kg, and 0.23 kg of high-purity neodymium oxide (purity: 99.9%, produced by Wako Pure Chemical Ind. Ltd.) was used in place of the high-purity lanthanum oxide.

Example 19

A composite oxide was produced in the same manner as in Example 8, except that in the preparation of the starting material, the amount of high-purity zirconium oxide was changed to 4.17 kg, the amount of high-purity cerium oxide was changed to 5.60kg, and 0.21 kg of high-purity praseodymium oxide (purity: 99.9%, produced by Wako Pure Chemical Ind. Ltd.) was used in place of the high-purity lanthanum oxide.

Comparative Example 1

A composite oxide was produced in the same manner as in Examples 1 and 8, except that in the preparation of the starting material, no transition metal element raw material was used, and only 4.17 kg of high-purity zirconium oxide and 5.83 kg of high-purity cerium oxide were used.

Evaluation Method

The specific surface area, average particle diameter, and OSC of the composite oxides obtained in the Examples and Comparative Example, the half-width of the XRD, and the value of $\{I111/(I111+I222)\}\times100$ in the XPD (i.e., T value) were each evaluated by the following methods.

Specific Surface Area

The specific surface area was measured by the BET method using a specific surface area measuring instrument ("Macsorb," produced by Mountech).

Average Particle Diameter

The ground composite oxides obtained in the Examples and Comparative Example were analyzed using a laser diffraction/scattering analyzer ("LS230," produced by Coulter Co., Ltd.).

OSC: Oxygen Storage Capacity

First, the oxygen release initiation temperature and the amount of oxygen released were determined by temperature-programmed reduction using hydrogen, which is called "$H_2$-TPR," using a commercially available measuring device (BEL Japan Inc., "Multitask T.P.R."). Further, the amount of oxygen absorbed was determined by the $O_2$ pulse method. Specifically, the amount of oxygen absorbed was measured through the following processes (a) to (g) in this order:

(a) The composite oxide was ground to form a powder, and 0.2 g of the powder was weighed.

(b) The weighed powder was set in a flow-type reactor, the temperature of the atmosphere was raised to 450° C., 600° C., or 750° C. in a He flow, and the temperature was maintained for 1 hour.

(c) The temperature of the composite oxide was adjusted to 450° C., 600° C., or 750° C.

(d) A predetermined amount of oxygen was introduced into the atmosphere.

(e) The amount of unabsorbed oxygen was confirmed with a thermal conductivity detector (TCD).

(f) The introduction of a predetermined amount of oxygen into the atmosphere in (d), and the confirmation of the amount of unabsorbed oxygen in (e) were repeated until the amount of oxygen introduced and the amount of unabsorbed oxygen were equivalent.

(g) The amount of oxygen absorbed, i.e., the OSC amount, was calculated by calculation. This calculation was conducted by subtracting the amount of unabsorbed oxygen from the previously determined amount of oxygen introduced.

The above OSC measurement was performed on both composite oxides before and after a heating endurance test (Fresh). The heating endurance test was performed under either of the following two conditions: treatment of heating 5 g of composite oxide in an atmosphere of 1,000° C. for 3 hours (hereinafter referred to as "heating endurance test 1"), and treatment of heating 5 g of composite oxide in an atmosphere of 1,100° C. for 3 hours (hereinafter referred to as "heating endurance test 2").

T Value

The value of $\{I111/(I111+I222)\}\times100$ (T value) was calculated based on the XRD chart obtained from the XRD measurement of the composite oxide heated under the conditions of the heating resistance test 1. Specifically, in the XRD chart, a diffraction peak appearing at $2\theta=14$ to 15° was regarded as the (111) plane, and a diffraction peak appearing at $2\theta=23.5$ to 30.5° was regarded as the (222) plane; and the intensity ratio of these peaks was calculated to thereby determine the T value. The XRD measurement was performed using RINT2500 (produced by Rigaku Corporation) under the following measurement conditions.
X-ray source: CuKα
Sampling interval: 0.02 degrees
Scanning speed: 1.0 deg/min
Divergence slit (DS): 1 degree
Divergence vertical limit slit: 5 mm
Scatter slit (SS): 1 degree
Receiving slit (RS): 0.3 mm
Monochrome receiving slit: 0.8 mm
Tube voltage: 50 kV
Tube current: 300 mA A diffraction peak appearing at 2θ=14 to 15° was regarded as the (111) plane, and a diffraction peak appearing at 2θ=28.5 to 30.5° was regarded as the (222) plane.

TABLE 1

| Evaluation item | Comp. Ex. 1 | Ex. 1 | Ex. 2 | Ex. 3 | Ex. 4 | Ex. 5 | Ex. 6 | Ex. 7 |
|---|---|---|---|---|---|---|---|---|
| Zr [mol %] | 50.0 | 49.9 | 49.5 | 47.5 | 49.9 | 49.9 | 49.9 | 49.9 |
| Ce [mol %] | 50.0 | 49.9 | 49.5 | 47.5 | 49.9 | 49.9 | 49.9 | 49.9 |
| Fe [mol %] | — | 0.2 | 1.0 | 5.0 | — | — | — | — |
| Mn [mol %] | — | — | — | — | 0.2 | — | — | — |
| Ni [mol %] | — | — | — | — | — | 0.2 | — | — |
| Cu [mol %] | — | — | — | — | — | — | 0.2 | — |
| Co [mol %] | — | — | — | — | — | — | — | 0.2 |
| Specific surface area [m²/g] | 0.8 | 0.8 | 0.8 | 0.6 | 0.7 | 0.9 | 0.8 | 1.0 |
| Average particle diameter [μm] | 10.7 | 9.9 | 9.3 | 10.8 | 9.4 | 10.1 | 9.7 | 9.9 |
| 600° C. OSC (fresh) [mmol/g] | 0.24 | 0.30 | 0.49 | 0.57 | 0.68 | 0.56 | 0.84 | 0.80 |
| 600° C. OSC (1000° C. × 3 h) [mmol/g] | 0.04 | 0.36 | 0.45 | 0.50 | 0.58 | 0.44 | 0.59 | 0.52 |
| 600° C. OSC (1100° C. × 3 h) [mmol/g] | 0 | 0.30 | 0.33 | — | 0.52 | 0.41 | 0.50 | 0.44 |
| 750° C. OSC (fresh) [mmol/g] | 0.54 | 0.59 | 0.65 | 0.65 | 0.85 | 0.70 | 0.85 | 0.85 |
| 750° C. OSC (1000° C. × 3 h) [mmol/g] | 0.29 | 0.46 | 0.55 | 0.59 | 0.63 | 0.55 | 0.61 | 0.65 |
| 750° C. OSC (1100° C. × 3 h) [mmol/g] | 0.19 | 0.44 | 0.45 | — | 0.55 | 0.51 | 0.55 | 0.54 |
| T value (1000° C. × 3 h) [%] | 0 | 1 | 2 | 2 | 1 | 1 | 1 | 1 |

TABLE 2

| Evaluation item | Comp. Ex. 1 | Ex. 8 | Ex. 9 | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|---|---|
| Zr [mol %] | 50.0 | 47.5 | 47.5 | 47.5 | 47.5 | 50.0 | 50.0 | 50.0 | 50.0 | 50.0 | 50.0 | 50.0 | 50.0 |
| Ce [mol %] | 50.0 | 47.5 | 47.5 | 47.5 | 47.5 | 48.0 | 45.0 | 40.0 | 48.0 | 45.0 | 40.0 | 48.0 | 48.0 |
| La [mol %] | — | 5.0 | — | — | — | 2.0 | 5.0 | 10.0 | — | — | — | — | — |
| Y [mol %] | — | — | 5.0 | — | — | — | — | — | 2.0 | 5.0 | 10.0 | — | — |
| Mg [mol %] | — | — | — | 5.0 | — | — | — | — | — | — | — | — | — |
| Ca [mol %] | — | — | — | — | 5.0 | — | — | — | — | — | — | — | — |
| Nd [mol %] | — | — | — | — | — | — | — | — | — | — | — | 2.0 | — |
| Pr [mol %] | — | — | — | — | — | — | — | — | — | — | — | — | 2.0 |
| Specific surface area [m²/g] | 0.8 | 1.2 | 1.2 | 0.9 | 1.1 | 1.0 | 1.6 | 1.4 | 1.0 | 1.0 | 1.3 | 1.1 | 1.0 |
| Average particle diameter [μm] | 10.7 | 9.4 | 10.8 | 9.7 | 9.4 | 8.0 | 8.5 | 7.5 | 8.9 | 9.0 | 8.4 | 9.8 | 8.3 |
| 450° C. OSC (1000° C. × 3 h) [mmol/g] | 0 | 0.02 | 0.02 | 0.01 | 0.02 | 0.02 | 0.02 | 0.02 | 0.02 | 0.02 | 0.05 | 0.02 | 0.02 |
| 600° C. OSC (1000° C. × 3 h) [mmol/g] | 0.04 | 0.17 | 0.19 | 0.06 | 0.16 | 0.13 | 0.11 | 0.27 | 0.11 | 0.29 | 0.33 | 0.11 | 0.10 |
| 750° C. OSC (1000° C. × 3 h) [mmol/g] | 0.29 | 0.42 | 0.44 | 0.36 | 0.41 | 0.45 | 0.46 | 0.42 | 0.46 | 0.46 | 0.45 | 0.45 | 0.44 |
| T value (1000° C. × 3 h) [%] | 0 | 2 | 2 | 1 | 2 | 1 | 3 | 3 | 3 | 3 | 2 | 2 | 2 |

Figure 3:
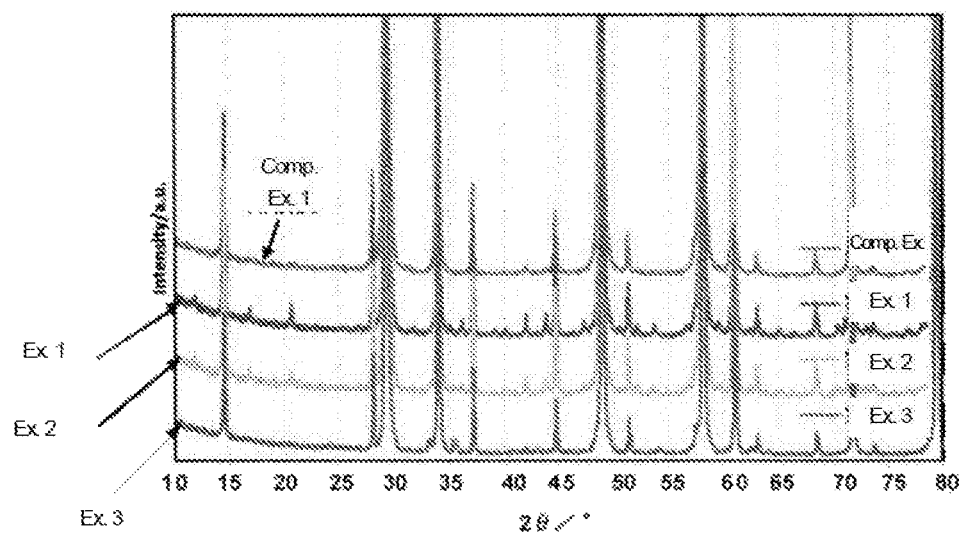
FIG. 3 shows X-ray charts obtained by XRD analysis of the cerium-zirconium-based composite oxides of Examples 1 to 3 and Comparative Example 1; (a) is an X-ray chart before a heating endurance test (before a heat treatment at 1,000° C. for 3 hours), and (b) is an X-ray chart after a heating endurance test (after a heat treatment at 1,000° C. for 3 hours).
Figure 3:
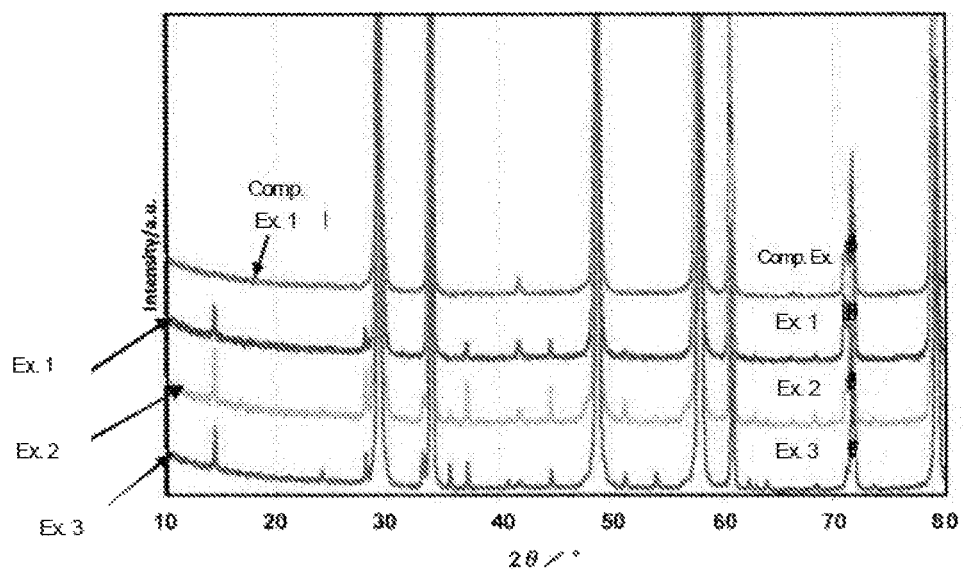
Figure 4:
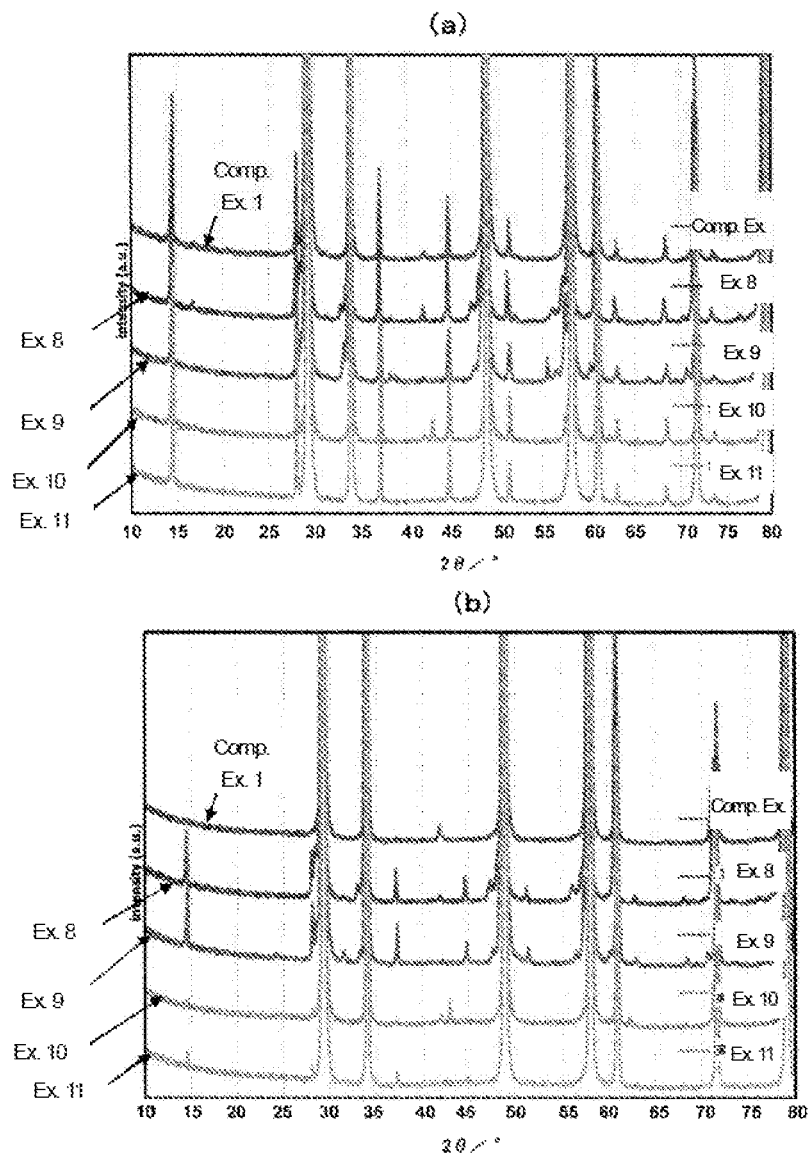
FIG. 4 shows X-ray charts obtained by XRD analysis of the cerium-zirconium-based composite oxides of Examples 8 to 11 and Comparative Example 1; (a) is an X-ray chart before a heating endurance test (before a heat treatment at 1,000° C. for 3 hours), and (b) is an X-ray chart after a heating endurance test (after a heat treatment at 1,000° C. for 3 hours).

FIG. 3 shows an example of the results of XRD analysis of the four composite oxides obtained in Examples 1 to 3 and Comparative Example 1 before and after the heating endurance test, and FIG. 4 shows an example of the results of XRD analysis of the five composite oxides obtained in Examples 8 to 11 and Comparative Example 1 before and after the heating endurance test. Specifically, FIGS. 3(a) and 4(a) show X-ray charts before the heating endurance test, and FIGS. 3(b) and 4(b) show X-ray charts after the heating endurance test 1.

Further, Tables 1 and 2 show the elemental composition (mol %) of the composite oxides obtained in the Examples and Comparative Example, and the results of the specific surface area average particle diameter (μm), OSC (mmol/g), half-width (degree), and T value (%). In Table 1, "600° C. OSC (Fresh)" and "750° C. OSC (Fresh)" refer to, respectively, the OSCs at 600° C. and 750° C. of the composite oxide that is not subjected to the heating endurance test. Moreover, "600° C. OSC (1000° C.×3 h)" and "750° C. OSC (1000° C.×3 h)" refer to, respectively, the OSCs at 600° C. and 750° C. of the composite oxide after the heating endurance test 1. Furthermore, "600° C. OSC (1100° C.×3 h)" and "750° C. OSC (1100° C.×3 h)" refer to, respectively, the OSCs at 600° C. and 750° C. of the composite oxide after the heating endurance test 2. In Table 2, "450° C. OSC (1000° C.×3 h)," "600° C. OSC (1000° C.×3 h)," and "750° C. OSC (1000° C.×3 h)" refer to, respectively, the OSCs at 450° C., 600° C., and 750° C. of the composite oxide after the heating endurance test.

As is clear from FIGS. 3(a) and 3(b), all of the composite oxides obtained in Examples 1 to 3 before and after the heating endurance test showed a sharp peak at around 2θ/°=15, which indicates the presence of a pyrochlore phase. Moreover, the results of the above XRD analysis and the results shown in Table 1 indicated that all of the composite oxides obtained in Examples 1 to 3 had a T value of 1 or more, and a half-width of 0.1 to 0.3 degrees. These results demonstrate that a pyrochlore phase was confirmed in all of the composite oxides obtained in Examples 1 to 3 even after a heat treatment at 1,000° C. to 1,100° C. for 3 hours. Although not shown, the results of the same XRD analysis also confirmed the presence of a pyrochlore phase in the composite oxides of Examples 4 to 7 before and after the heating endurance test.

As is clear from FIGS. 4(a) and 4(b), all of the composite oxides obtained in Examples 8 to 11 before and after the heating endurance test showed a sharp peak at around 2θ/°=15, which indicates the presence of a pyrochlore phase. Moreover, the results of the above XRD analysis and the results shown in Table 1 indicate that all of the composite oxides obtained in Examples 1 to 4 had a T value of 1 or more, and a half-width of 0.1 to 0.3 degrees. These results demonstrate that a pyrochlore phase was confirmed in all of the composite oxides obtained in Examples 1 to 4 even after a heat treatment at 1,000° C. for 3 hours. Although not shown, the results of the same XRD analysis also confirmed the presence of a pyrochlore phase in the composite oxides of Examples 12 to 19 before and after the heating endurance test.

On the other hand, FIG. 3(b) and FIG. 4(b) show that in the composite oxide of Comparative Example 1, which comprised only cerium and zirconium and did not contain a third element, the peak observed at around 2θ/°=15 disappeared after the heating endurance test. This indicates that the pyrochlore phase was no longer present in the composite oxide of Comparative Example 1 due to the heating endurance test.

As described above, it is revealed that the crystal structure of the cerium-zirconium-based composite oxides obtained in Examples 1 to 7 after the heating endurance test is clearly different from that of the conventional product free from a transition metal element (Comparative Example 1). Further, it is revealed that the crystal structure of the cerium-zirconium-based composite oxides obtained in Examples 8 to 19 after the heating endurance test is clearly different from that of the conventional product free from the element (b) (Comparative Example 1).

Figure 5:
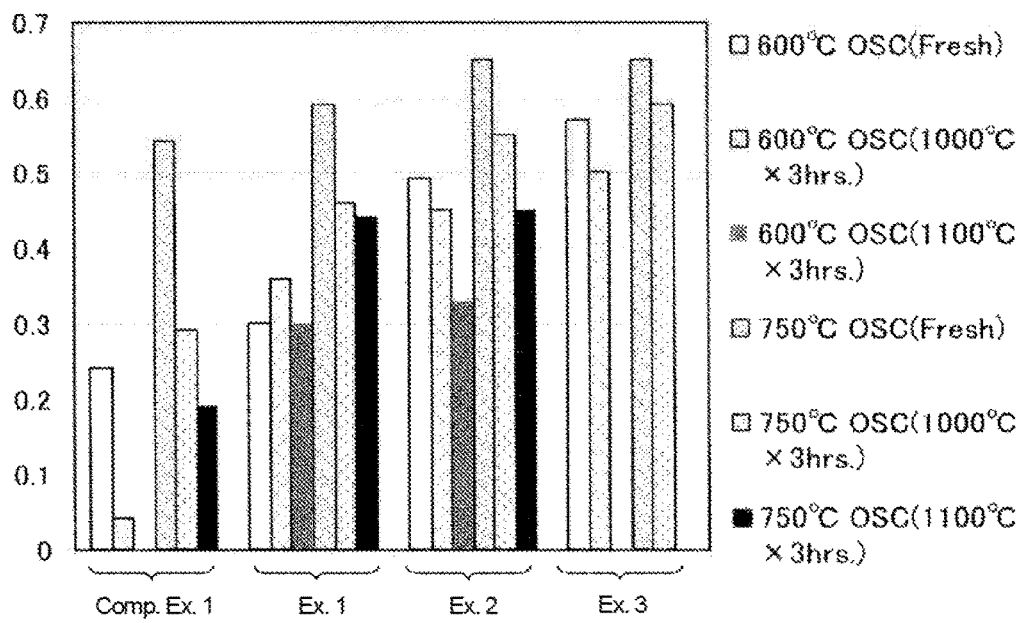
FIG. 5 is a graph showing the measurement results of the oxygen absorption rate of the cerium-zirconium-based composite oxides of Examples 1 to 3 and Comparative Example 1 at 600° C. and 750° C. before or after a heating endurance test (a heat treatment at 1,000° C. or 1,100° C. for 3 hours).

FIG. 5 shows the OSCs at predetermined temperatures of the composite oxides obtained in Examples 1 to 3 and Comparative Example 1 before and after the heating endurance test 1 or 2. Further, Table 1 shows the OSCs of all of the Examples and Comparative Example 1. As is clear from FIG. 5 and Table 1, all of the composite oxides obtained in Examples 1 to 7 had an OSC at 600° C. of 0.3 mmol/g or more, and an OSC at 750° C. of 0.4 mmol/g or more, after the heating endurance test. In contrast, the OSC of the composite oxide of Comparative Example 1 after the heating endurance test was lower than those of the composite oxides of the Examples. This is because the composite oxide of Comparative Example 1 does not form a pyrochlore phase after the heating endurance test.

Figure 6:
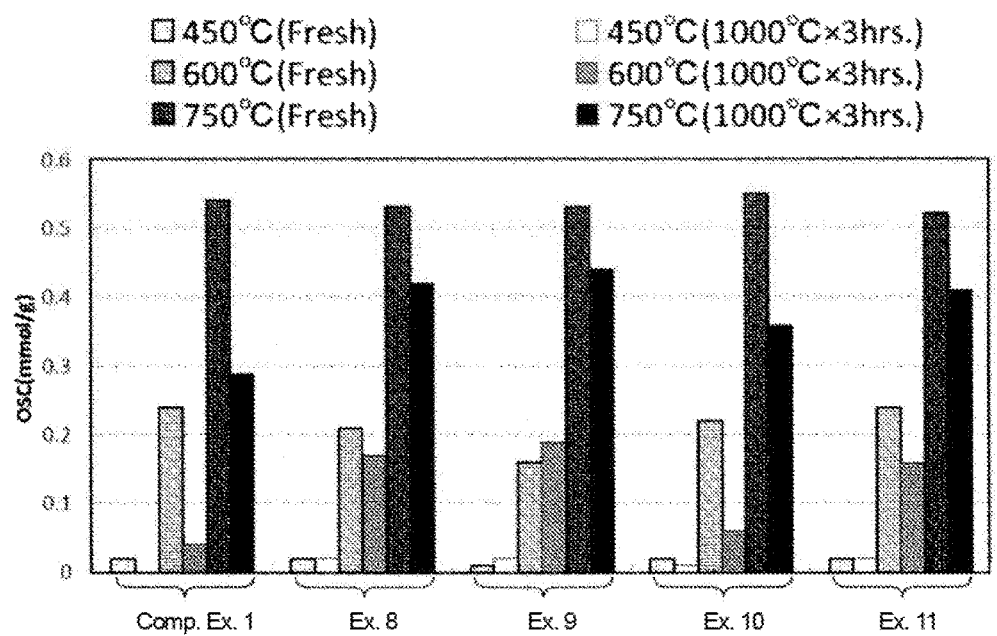
FIG. 6 is a graph showing the measurement results of the oxygen absorption rate of the cerium-zirconium-based composite oxides of Examples 3 to 11 and Comparative Example 1 at 450° C., 600° C., and 750° C. before or after a heating endurance test (a heat treatment at 1,000° C. for 3 hours).

FIG. 6 shows the OSCs at predetermined temperatures (450° C., 600° C., and 750° C.) of the composite oxides obtained in Examples 8 to 11 and Comparative Example 1 before the heating endurance test (Fresh) and after the heating endurance test (1000° C.×3 hrs.). Further, Table 2 shows the OSCs of all of the Examples and Comparative Example 1. As is clear from FIG. 6 and Table 1, all of the composite oxides obtained in Examples 8 to 19 had an OSC at 450° C. of 0.01 mmol/g or more, an OSC at 600° C. of 0.05 mmol/g or more, and an OSC at 750° C. of 0.3 mmol/g or more, after the heating endurance test. In contrast, the OSC of the composite oxide of Comparative Example 1 after the heating endurance test was lower than those of the composite oxides of the Examples. This is because the composite oxide of Comparative Example 1 does not form a pyrochlore phase after the heating endurance test.

Figure 7:
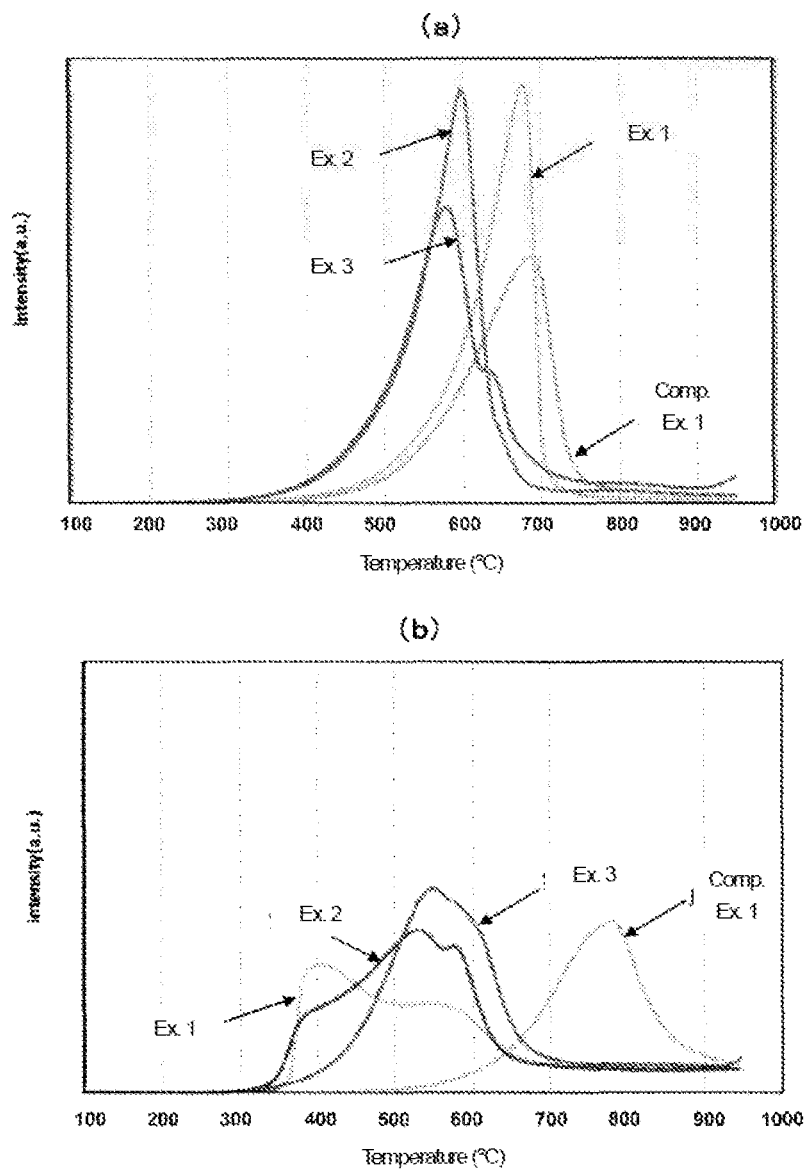
FIG. 7 shows profiles of temperature programmed reduction of the cerium-zirconium-based composite oxides of Examples 1 to 3 and Comparative Example 1; (a) is a profile before a heating endurance test (before a heat treatment at 1,000° C. for 3 hours), and (b) is a profile after a heating endurance test (after a heat treatment at 1,000° C. for 3 hours).

FIG. 7 shows profiles of temperature programmed reduction of the cerium-zirconium-based composite oxides; (a) is a profile before the heating endurance test, and (b) is a profile after the heating endurance test 1 (after a heat treatment at 1,000° C. for 3 hours). Specifically, FIG. 7 shows the temperature-programmed reduction profiles of the composite oxides of Examples 1 to 3 and Comparative Example 1, and FIG. 8 shows the temperature-programmed reduction profiles of the composite oxides of Examples 8 to 11 and Comparative Example 1.

Figure 8:
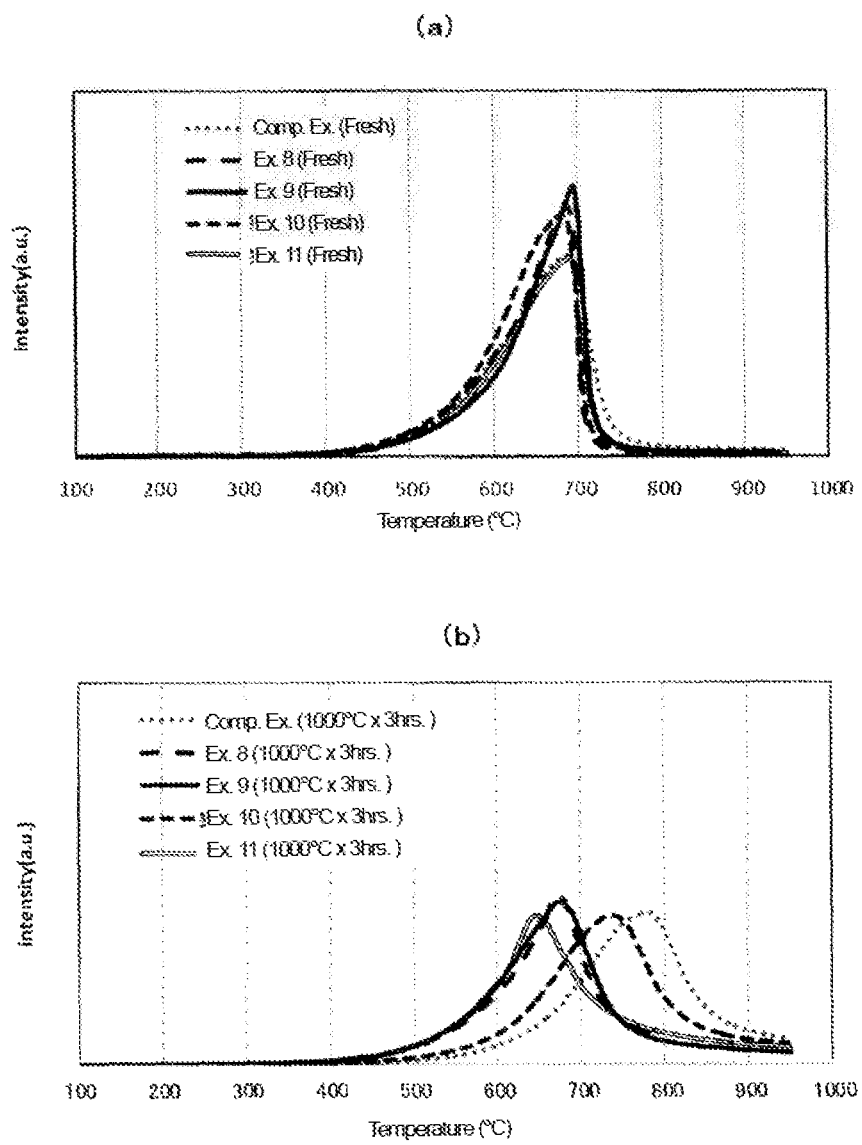
FIG. 8 shows profiles of temperature programmed reduction of the cerium-zirconium-based composite oxides of Examples 8 to 11 and Comparative Example 1; (a) is a profile before a heating endurance test (before a heat treatment at 1,000° C. for 3 hours), and (b) is a profile after a heating endurance test (after a heat treatment at 1,000° C. for 3 hours).

As is clear from FIGS. 7 and 8, the peaks of the composite oxides of Examples 1 to 3 and Examples 8 to 11 after the heating endurance test (FIG. 7(b) and FIG. 8(b)) shifted closer to the low temperature side than the composite oxide of Comparative Example 1. This suggests that the oxygen absorption and release initiation temperature of the composite oxides of Examples 1 to 3 and Examples 8 to 11 after the heat treatment is lower than that of the composite oxide of Comparative Example 1. Further, the results of FIGS. 7 and 8 reveal that the oxygen absorption and release initiation temperature of the composite oxides of Examples 1 to 3 and Examples 8 to 11 was even lower after the heating endurance test than before the heating endurance test. The oxygen absorption and release function was exhibited at a lower temperature.

In light of the above, the composite oxides of the Examples have an excellent OSC, even though they do not contain noble metal elements. Furthermore, because the crystal structure containing a pyrochlore phase is stably present even after a heat treatment, the composite oxides maintain an excellent OSC even when they are exposed to a high temperature. This demonstrated that the composite oxides of the Examples are catalyst, materials that can exhibit high catalytic activity and have excellent heat resistance.

INDUSTRIAL APPLICABILITY

The cerium-zirconium-based composite oxide of the present invention is a material having an excellent OSC, high catalytic activity, and excellent heat resistance. Accordingly, the cerium-zirconium-based composite oxide of the present invention can be used as an exhaust gas purifying catalyst used for vehicles, etc., and can also be used as an OSC agent for various catalyst applications. Therefore, the above composite oxide can make it possible to build a purifying system having excellent purification performance.

The invention claimed is:

1. A cerium-zirconium-based composite oxide comprising cerium, zirconium, and a third element other than these elements;
wherein the third element is
(a) a transition metal element or
(b) at least one or more elements selected from the group consisting of rare earth elements and alkaline earth metal elements;
after a heat treatment at 1,000° C. to 1,100° C. for 3 hours,
(1) the composite oxide has a crystal structure containing a pyrochlore phase,
(2) when the peak intensity of a (111) plane measured by an X-ray diffraction method is regarded as I111, and the peak intensity of a (222) plane is regarded as I222, a value of $\{I111/(I111+I222)\} \times 100$ is 1 or more, and
(3) the composite oxide has an oxygen storage capacity at 600° C. of 0.05 mmol/g or more, and an oxygen storage capacity at 750° C. of 0.3 mmol/g or more; and
the third element is contained in an amount of 0.01 to 10 mol % in terms of oxide.

2. The cerium-zirconium-based composite oxide according to claim 1, wherein the third element is (a) a transition metal element; and
after a heat treatment at 1,000° C. to 1,100° C. for 3 hours, the composite oxide has an oxygen storage capacity at 600° C. of 0.3 mmol/g or more, and an oxygen storage capacity at 750° C. of 0.4 mmol/g or more.

3. The cerium-zirconium-based composite oxide according to claim 2, wherein the transition metal element (a) is at least one or more elements selected from the group consisting of iron, manganese, cobalt, nickel, and copper.

4. The cerium-zirconium-based composite oxide according to claim 1, wherein the third element is (b) at least one or more elements selected from the group consisting of rare earth elements and alkaline earth metal elements; and
after a heat treatment at 1,000° C. to 1,100° C. for 3 hours, the composite oxide has an oxygen storage capacity at 450° C. of 0.01 mmol/g or more.

5. The cerium-zirconium-based composite oxide according to claim 4, wherein the rare earth element is at least one or more members selected from the group consisting of lanthanum, neodymium, praseodymium, and yttrium; and
the alkaline earth metal element is at least one member selected from calcium and magnesium.

6. The cerium-zirconium-based composite oxide according to claim 1, wherein the cerium and the zirconium are contained at a molar ratio of $CeO_2:ZrO_2=1:9$ to 9:1 in terms of oxide.

7. The cerium-zirconium-based composite oxide according to claim 1, wherein the third element is (a) a transition metal element, and
the transition metal element (a) is at least one or more elements selected from the group consisting of iron, manganese, cobalt, and nickel.

8. The cerium-zirconium-based composite oxide according to claim 1, wherein the third element is (a) a transition metal element, and
the transition metal element (a) is iron.

9. The cerium-zirconium-based composite oxide according to claim 1, wherein the third element is (a) a transition metal element, and
the transition metal element (a) is contained in an amount of 0.1-1 mol % in terms of oxide.

10. The cerium-zirconium-based composite oxide according to claim 1, wherein the composite oxide is free of noble metals.

11. The cerium-zirconium-based composite oxide according to claim 10, wherein the third element is (a) a transition metal element,
the transition metal element (a) is at least one or more elements selected from the group consisting of iron, manganese, cobalt, nickel, and copper,
wherein after a heat treatment at 1,000° C. to 1,100° C. for 3 hours, the composite oxide has an oxygen storage capacity at 600° C. of 0.3 mmol/g or more, and an oxygen storage capacity at 750° C. of 0.4 mmol/g or more, and
the transition metal element (a) is contained in an amount of 0.1-1 mol % in terms of oxide.

12. The cerium-zirconium-based composite oxide according to claim 11, wherein the third element is (a) a transition metal element, and
the transition metal element (a) is at least one or more elements selected from the group consisting of iron, manganese, cobalt, and nickel.

13. The cerium-zirconium-based composite oxide according to claim 12, wherein the transition metal element (a) is iron.

14. The cerium-zirconium-based composite oxide according to claim 1, wherein the transition metal element (a) is at least one or more elements selected from the group consisting of vanadium, chromium, manganese, iron, cobalt, nickel, and zinc.

15. A method for producing the cerium-zirconium-based composite oxide according to claim 1, the method comprising the following steps (1) to (5):
(1) preparing a starting material comprising a cerium raw material, a zirconium raw material, a third element raw material other than these materials, wherein the third element raw material is:
(a) a transition metal element raw material or
(b) at least one material selected from the group consisting of rare earth element raw materials and alkaline earth metal element raw materials;
(2) heating the starting material at a temperature at or above a melting point by heating with an electric energy of 600 to 800 kWh/kg in terms of electric power consumption, and then heating with an electric energy of 800 to 1,000 kWh/kg in terms of electric power consumption, thereby obtaining a molten material;

(3) gradually cooling the molten material to form an ingot;
(4) grinding the ingot into a powder; and
(5) heating the powder at 700 to 1,100° C.

\* \* \* \* \*